(12) United States Patent  
Tamai

(10) Patent No.: US 7,933,201 B2  
(45) Date of Patent: Apr. 26, 2011

(54) ENTRY COMPRESSION/DECOMPRESSION METHOD AND APPARATUS PERFORMING AN ENTRY COMPRESSION AND DECOMPRESSION

(75) Inventor: Hiroaki Tamai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 741 days.

(21) Appl. No.: 11/905,351

(22) Filed: Sep. 28, 2007

(65) Prior Publication Data

US 2008/0159293 A1 Jul. 3, 2008

(30) Foreign Application Priority Data

Dec. 29, 2006 (JP) .................................. 2006-356919

(51) Int. Cl.
*G01R 31/06* (2006.01)
(52) U.S. Cl. ........................................ 370/230; 370/235
(58) Field of Classification Search .................. 370/230, 370/235
See application file for complete search history.

(56) References Cited

U.S. PATENT DOCUMENTS

| | | | | |
|---|---|---|---|---|
| 7,711,893 | B1 * | 5/2010 | Venkatachary | ............... 711/108 |
| 7,738,465 | B2 | 6/2010 | Akahane et al. | |
| 2006/0059196 | A1 * | 3/2006 | Sato et al. | .................. 707/104.1 |

FOREIGN PATENT DOCUMENTS

| | | |
|---|---|---|
| JP | 63-158628 A | 7/1988 |
| JP | 2000-209210 A | 7/2000 |
| JP | 2002-199025 | 7/2002 |
| JP | 2005-323183 | 7/2002 |
| JP | 2003-008662 | 1/2003 |
| JP | 2003-018198 | 1/2003 |
| JP | 2005-51736 A | 2/2005 |
| JP | 2002-199025 | 11/2005 |
| JP | 2005-323183 | 11/2005 |
| JP | 2006-135660 A | 5/2006 |

OTHER PUBLICATIONS

Japanese Notice of Rejection Ground, English-language translation, mailed Feb. 8, 2011 for corresponding Japanese Application No. 2006-356919.

* cited by examiner

*Primary Examiner* — Huy D Vu
*Assistant Examiner* — Kibrom T Hailu
(74) *Attorney, Agent, or Firm* — Fujitsu Patent Center

(57) ABSTRACT

An entry compression/decompression method for use in a packet relay apparatus carrying out flow identification based on an entry of a flow table describing a pattern of a packet as a subject of flow identification, comprising the steps of judging whether a new pattern to be registered in the flow table is an incremental pattern, that is, a difference with a flow identification pattern of the entry is one bit; changing a mask pattern of the entry indicating a position of a "don't care bit" in relation with the flow identification pattern in flow identification if the new pattern is an incremental pattern; and additionally registering the new pattern in the flow table as an entry if the new pattern is not an incremental pattern.

9 Claims, 21 Drawing Sheets

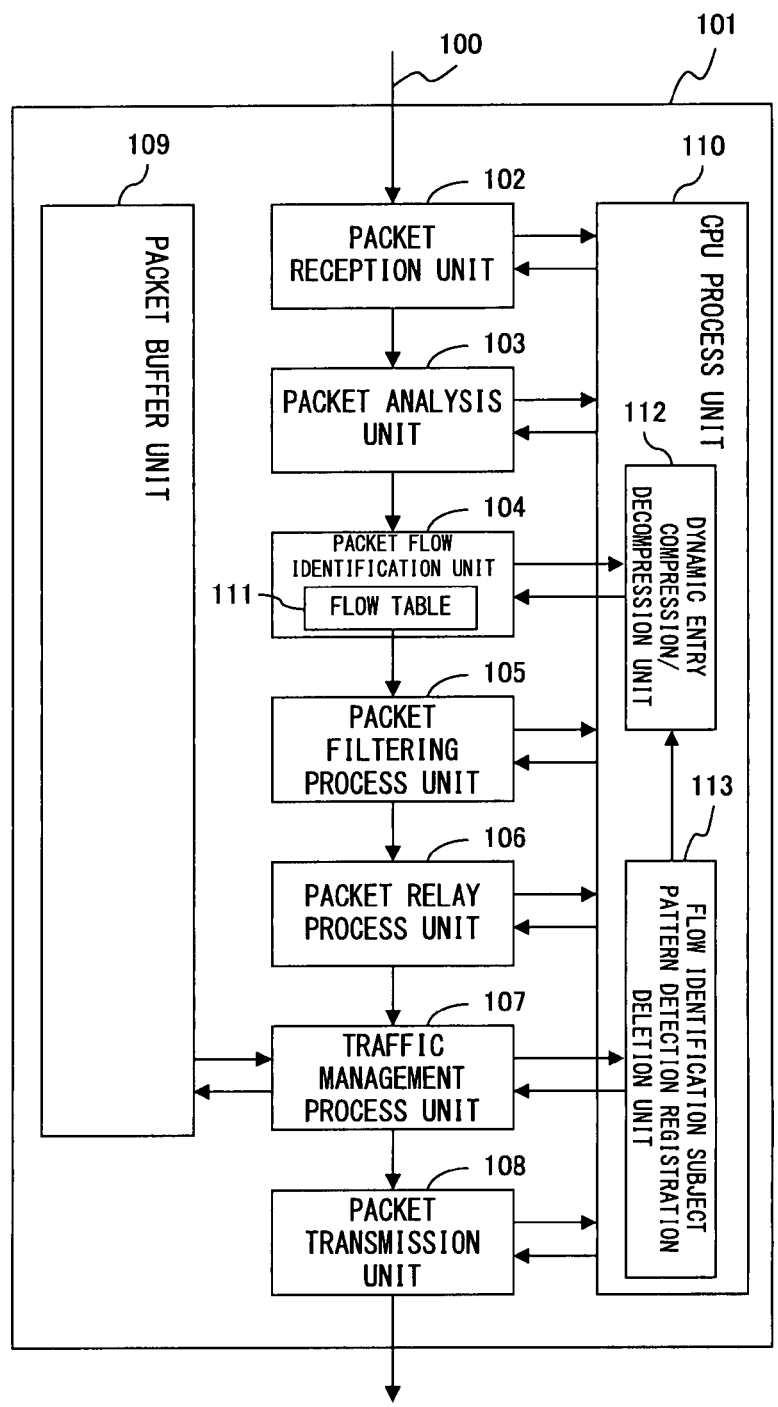
F I G. 4

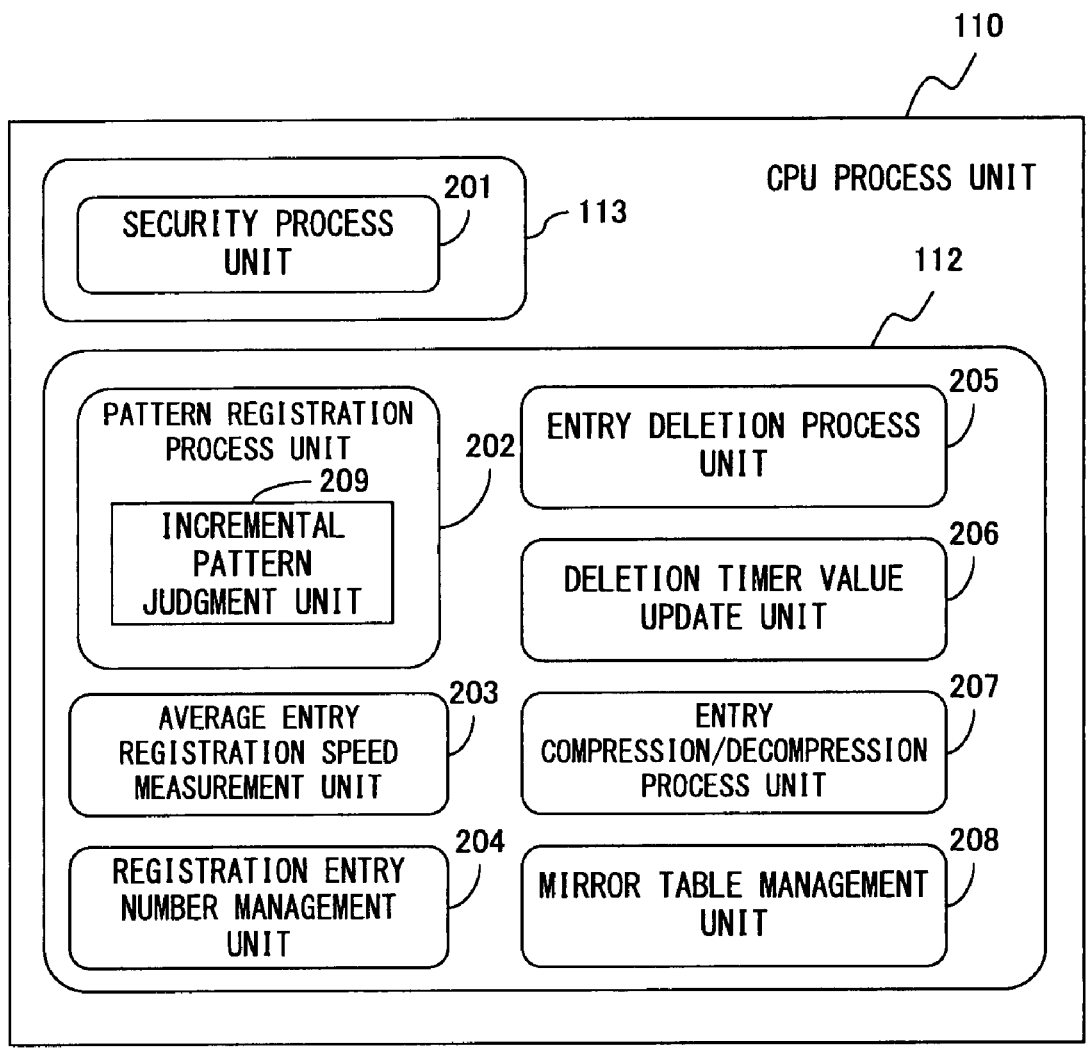
F I G. 5

| FLOW IDENTIFICATION PATTERN | MASK PATTERN | COMPARISON POSITION (OFFSET) INFORMATION | PACKET CATEGORY | FLOW ID | NUMBER OF COMPRESSED ENTRIES | NUMBER OF RELEASE PATTERNS | DELETION TIMER VALUE | RELEASE FLAG |
|---|---|---|---|---|---|---|---|---|
| 00000e000001 | ffffffffffff | 0 | NO TAG; IP | 3 | 0 | 0 | fffffff0 | 0 |
| 00000e000002 | fffffffffffe | 0 | NO TAG; IP | 3 | 2 | 0 | ffffffff | 0 |
| | | | | | | | | |
| | | | | | | | | |
| | | | | | | | | |
| | | | | | | | | |
| | | | | | | | | |

111

F I G. 6

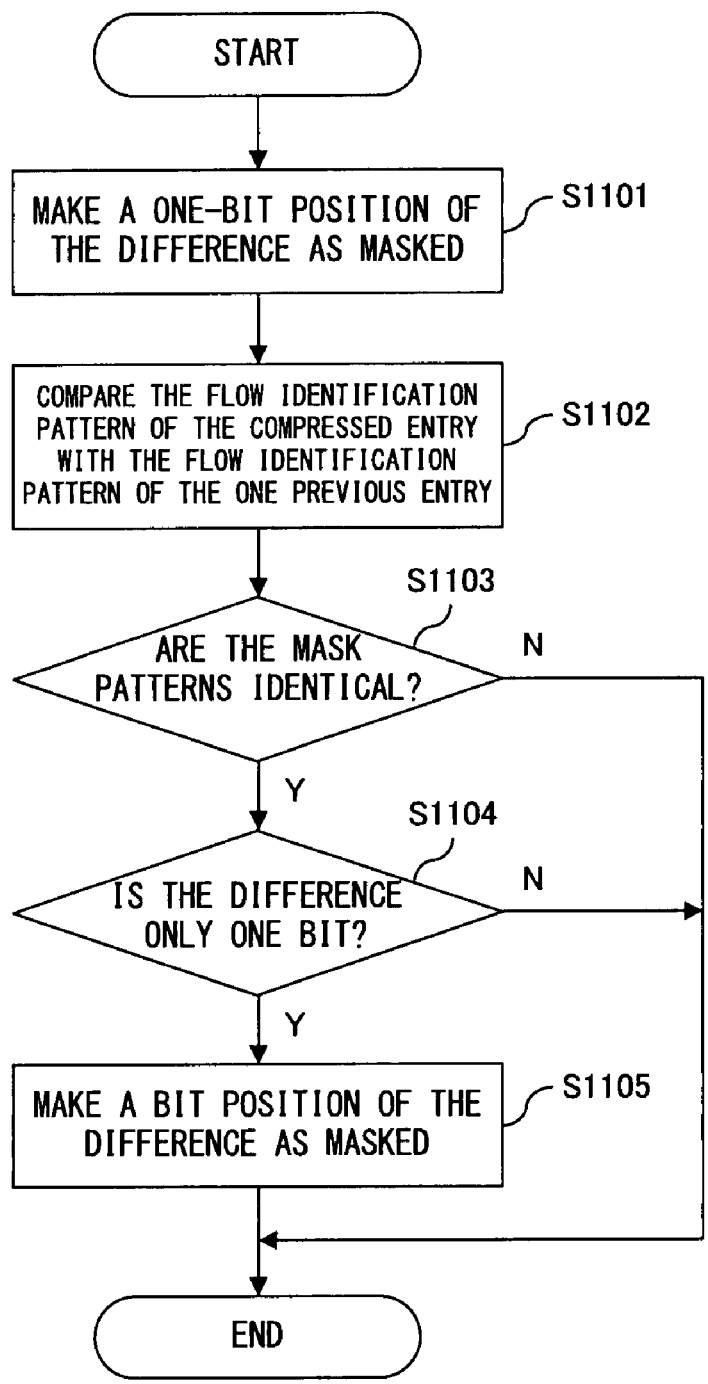
F I G. 1 4

1501

| FLOW IDENTIFICATION PATTERN | MASK PATTERN | COMPARISON POSITION (OFFSET) INFORMATION | PACKET CATEGORY | FLOW ID | NUMBER OF COMPRESSED ENTRIES | NUMBER OF RELEASE PATTERNS | DELETION TIMER VALUE | RELEASE FLAG |
|---|---|---|---|---|---|---|---|---|
| 00000e000001 | ffffffffffff | 0 | NO TAG; IP | 3 | 0 | 0 | ffffffff | 0 |
| | | | | | | | | |
| | | | | | | | | |
| | | | | | | | | |
| | | | | | | | | |
| | | | | | | | | |

↓ EXAMPLE OF REGISTERING A MAC DA; FLOW ID = 3 MEANS A SUBJECT OF FILTERING AND DISCARDING

1502

| FLOW IDENTIFICATION PATTERN | MASK PATTERN | COMPARISON POSITION (OFFSET) INFORMATION | PACKET CATEGORY | FLOW ID | NUMBER OF COMPRESSED ENTRIES | NUMBER OF RELEASE PATTERNS | DELETION TIMER VALUE | RELEASE FLAG | |
|---|---|---|---|---|---|---|---|---|---|
| 00000e000001 | ffffffffffff | 0 | NO TAG; IP | 3 | 0 | 0 | ffffff0 | 0 | |
| 00000e000002 | ffffffffffff | 0 | NO TAG; IP | 3 | 0 | 0 | fffffff8 | 0 | ←SUBJECT OF COMPRESSION |
| 00000e000003 | ffffffffffff | 0 | NO TAG; IP | 3 | 0 | 0 | ffffffff | 0 | ←SUBJECT OF COMPRESSION |
| | | | | | | | | | |
| | | | | | | | | | |
| | | | | | | | | | |

↓ EXAMPLE OF ADDING A MAC DA ENTRY; JUDGED TO BE AN INCREMENTAL ENTRY AND ACTUALLY THE FOLLOWING ENTRIES ARE UPDATED

1503

| FLOW IDENTIFICATION PATTERN | MASK PATTERN | COMPARISON POSITION (OFFSET) INFORMATION | PACKET CATEGORY | FLOW ID | NUMBER OF COMPRESSED ENTRIES | NUMBER OF RELEASE PATTERNS | DELETION TIMER VALUE | RELEASE FLAG |
|---|---|---|---|---|---|---|---|---|
| 00000e000001 | ffffffffffff | 0 | NO TAG; IP | 3 | 0 | 0 | ffffff0 | 0 |
| 00000e000002 | fffffffffffe | 0 | NO TAG; IP | 3 | 2 | 0 | ffffffff | 0 |
| | | | | | | | | |
| | | | | | | | | |
| | | | | | | | | |
| | | | | | | | | |

↓ EXAMPLE OF ADDING THE FOLLOWING MAC DA ENTRIES; JUDGED TO BE INCREMENTAL ENTRIES AND COMPRESSED
00000e000004
00000e000005
00000e000006
00000e000007

1504

| FLOW IDENTIFICATION PATTERN | MASK PATTERN | COMPARISON POSITION (OFFSET) INFORMATION | PACKET CATEGORY | FLOW ID | NUMBER OF COMPRESSED ENTRIES | NUMBER OF RELEASE PATTERNS | DELETION TIMER VALUE | RELEASE FLAG | |
|---|---|---|---|---|---|---|---|---|---|
| 00000e000001 | ffffffffffff | 0 | NO TAG; IP | 3 | 0 | 0 | ffffffe8 | 0 | |
| 00000e000002 | fffffffffffe | 0 | NO TAG; IP | 3 | 2 | 0 | fffffff8 | 0 | |
| 00000e000004 | fffffffffffc | 0 | NO TAG; IP | 3 | 4 | 0 | ffffffff | 0 | ←COMPRESSED |
| | | | | | | | | | |
| | | | | | | | | | |
| | | | | | | | | | |

↓
(A)

F I G. 1 8 A

Ⓑ
↓ EXAMPLE OF ADDING THE FOLLOWING MAC DA ENTRY; AFTER A NORMAL REGISTRATION PROCESS, A COMPRESSION PROCESS JUDGMENT IS CARRIED OUT
00000e000000

1509

| FLOW IDENTIFICATION PATTERN | MASK PATTERN | COMPARISON POSITION (OFFSET) INFORMATION | PACKET CATEGORY | FLOW ID | NUMBER OF COMPRESSED ENTRIES | NUMBER OF RELEASE PATTERNS | DELETION TIMER VALUE | RELEASE FLAG | |
|---|---|---|---|---|---|---|---|---|---|
| 00000e000001 | ffffffffffff | 0 | NO TAG; IP | 3 | 0 | 0 | fffffd8 | 0 | |
| 00000e000002 | fffffffffffe | 0 | NO TAG; IP | 3 | 2 | 0 | fffffe8 | 0 | ←SUBJECT OF DECOMPRESSION |
| 00000e000006 | ffffffffffff | 0 | NO TAG; IP | 3 | 0 | 0 | ffffff0 | 0 | |
| 00000e000000 | ffffffffffff | 0 | NO TAG; IP | 3 | 0 | 0 | ffffffff | 0 | ←REGISTERED |
| | | | | | | | | | |
| | | | | | | | | | |
| | | | | | | | | | |

↓ IF THE CONDITION OF A COMPRESSION JUDGMENT PROCESS, THE COMPRESSED ENTRIES ARE EXPANDED AND SORTED

1510

| FLOW IDENTIFICATION PATTERN | MASK PATTERN | COMPARISON POSITION (OFFSET) INFORMATION | PACKET CATEGORY | FLOW ID | NUMBER OF COMPRESSED ENTRIES | NUMBER OF RELEASE PATTERNS | DELETION TIMER VALUE | RELEASE FLAG | |
|---|---|---|---|---|---|---|---|---|---|
| 00000e000000 | ffffffffffff | 0 | NO TAG; IP | 3 | 0 | 0 | ffffffff | 0 | ←SUBJECT OF COMPRESSION |
| 00000e000001 | ffffffffffff | 0 | NO TAG; IP | 3 | 0 | 0 | fffffd0 | 0 | ←SUBJECT OF COMPRESSION |
| 00000e000002 | ffffffffffff | 0 | NO TAG; IP | 3 | 0 | 0 | fffffe0 | 0 | ←SUBJECT OF COMPRESSION |
| 00000e000003 | ffffffffffff | 0 | NO TAG; IP | 3 | 0 | 0 | fffffe0 | 0 | ←SUBJECT OF COMPRESSION |
| 00000e000006 | ffffffffffff | 0 | NO TAG; IP | 3 | 0 | 0 | fffffe8 | 0 | |
| | | | | | | | | | |
| | | | | | | | | | |

↓ RE-REGISTRATION PROCESS AND COMPRESSION PROCESS ARE CARRIED OUT IN THE SORTED ORDER

1511

| FLOW IDENTIFICATION PATTERN | MASK PATTERN | COMPARISON POSITION (OFFSET) INFORMATION | PACKET CATEGORY | FLOW ID | NUMBER OF COMPRESSED ENTRIES | NUMBER OF RELEASE PATTERNS | DELETION TIMER VALUE | RELEASE FLAG | |
|---|---|---|---|---|---|---|---|---|---|
| 00000e000000 | fffffffffffc | 0 | NO TAG; IP | 3 | 4 | 0 | ffffffff | 0 | ←COMPRESSED AND UPDATED |
| 00000e000006 | ffffffffffff | 0 | NO TAG; IP | 3 | 0 | 0 | fffffe8 | 0 | |
| | | | | | | | | | |
| | | | | | | | | | |
| | | | | | | | | | |
| | | | | | | | | | |
| | | | | | | | | | |

FIG. 18C

ENTRY COMPRESSION/DECOMPRESSION METHOD AND APPARATUS PERFORMING AN ENTRY COMPRESSION AND DECOMPRESSION

BACKGROUND OF THE INVENTION

1. Field of the Invention

The present invention relates to an entry compression/decompression method and an apparatus performing entry compression and decompression.

2. Description of the Related Art

There are conventional packet relay apparatuses performing a filtering and Quality of Service (QoS) for a packet in a network. These packet relay apparatuses compare a packet with information described in a table retained in the apparatus and carry out a prescribed process if a condition is satisfied.

FIG. 1 is a block diagram of a conventional packet relay apparatus.

The packet relay apparatus 1701 comprises a packet reception unit 1702, a packet analysis unit 1703, a packet flow identification unit 1704, a packet filtering process unit 1705, a packet relay process unit 1706, a traffic management process unit 1707, a packet transmission unit 1708, a packet buffer unit 1709 and a CPU process unit 1710.

The packet flow identification unit 1704 comprises a flow table 1711 describing a pattern possessed by a packet constituting a subject of flow identification.

The CPU process unit 1710 comprises a flow identification subject pattern registration deletion unit 1712.

The packet reception unit 1702 receives a packet from a line 1700 connected to a network.

The packet analysis unit 1703 analyzes a packet header of the received packet and identifies a packet category (as to a position of the packet where which information is located).

The packet flow identification unit 1704 identifies a method with which the packet is to be processed at the packet relay apparatus 1701 based on the information obtained at the packet analysis unit 1703 and a flow table set up by the CPU process unit 1710, that is, carries out flow identification. As an example, it identifies a packet to which a packet filtering and a QoS are to be applied.

The packet filtering process unit 1705 discards an unnecessary packet based on the information obtained from the packet flow identification unit 1704.

The packet relay process unit 1706 carries out, for example, the process for identifying a transmission destination based on the information obtained from the CPU process unit 1710, and the process for judging a transmission of a copy of the packet to the CPU process unit 1710 based on the identification result of the packet flow identification unit 1704.

The traffic management process unit 1707 manages a priority control and a band control such as providing a QoS in response to the identification result of the packet flow identification unit 1704.

The packet transmission unit 1708 transmits a packet to a line.

The packet buffer unit 1709 makes a packet stay for providing a QoS if the transmission line is congested.

The CPU process unit 1710 carries out a soft relay process for a packet not allowing a hard relay process and a table management process such as a path information management and flow identification information management.

The flow identification subject pattern registration deletion unit 1712 updates a content of a flow table of the packet flow identification unit 1704 based on an instruction from a user.

FIG. 2 is a diagram of a detail of a packet flow identification unit of a conventional packet relay apparatus.

The packet flow identification unit 1704 comprises a table (i.e., a flow table) 1711 for discerning what kind of packet a received packet 1801 is.

The flow table 1711 is set by the CPU process unit 1710. Items of the flow table 1711 include a flow identification pattern for comparing with a packet, a mask pattern for designating a "don't care bit" of the flow identification pattern, offset information indicating a comparison position, a packet category indicating a category of a packet, and a flow ID for identifying what kind of process the packet is to be applied in a later process.

The packet flow identification unit 1704 examines whether or not a received packet is identical with a flow identification pattern. If they are identical, the packet flow identification unit 1704 adds a flow ID corresponding to the flow identification pattern to the packet and outputs the resultant to the packet filtering process unit 1705.

In the process units in the downstream of the packet flow identification unit 1704, what kind of process is to be applied on the basis of the flow ID added to the packet.

In the above described packet relay apparatus, the user has been required to pre-register a pattern of packet constituting a subject of a filtering and a QoS in the flow table 1711 from the CPU process unit 1710. And the packet filtering process unit 1705, packet relay process unit 1706 and other units carry out a process corresponding to the flow ID.

In this case, the user is able to statically consider an upper limit of the number of entry registrations and a compression of the registration entries by using a mask pattern at the time of a registration.

Meanwhile, there is a case in which a pre-registration of a pattern constituting a subject of filtering, et cetera, is not possible, such as the case in which a virus-infected personal computer (PC) is brought in, in addition to the case of allowing a pre-registration of a pattern constituting the subject of a filtering, et cetera, as described above.

FIG. 3 is a block diagram of a conventional packet relay apparatus in the case of not allowing a pre-registration of a pattern constituting a subject.

The difference of the packet relay apparatus shown in FIG. 3 from the packet relay apparatus of FIG. 1 lies in the former comprising a flow identification subject pattern detection registration deletion unit 1713 in place of the flow identification subject pattern registration deletion unit 1712.

In the packet relay apparatus shown in FIG. 3, the CPU process unit 1710 receives a packet 1714 from the traffic management process unit 1707 and checks the packet 1714. If the packet 1714 satisfies a certain condition, e.g., the packet 1714 operates in a doubtful manner, the pattern of the packet 1714 is registered in the flow table 1711 of the packet flow identification unit 1704 as a subject of filtering.

In the packet relay apparatus in which a pattern cannot be pre-registered as described above, an entry of the flow table of the packet flow identification unit is dynamically additionally registered or deleted.

A Laid-Open Japanese Patent Application Publication No. 2003-8662 notes a network access control method and apparatus carrying out a filtering based on a prescribed setup when there is an external access and preventing an unauthorized external access.

The conventional packet relay apparatus, however, does not compress an entry when additionally registering a pattern constituting a subject of filtering, et cetera, in a table dynamically, and therefore is faced with a problem of reaching at the upper limit of the number of entry registration quickly.

SUMMARY OF THE INVENTION

It is an object of the present invention to provide a method and an apparatus for carrying out a compression and decompression of an entry when adding and deleting an entry dynamically.

In order to solve the above described problem, the present invention is contrived to adopt the following configuration.

That is, according to one aspect of the present invention, an entry compression/decompression method of the present invention is one for use in a packet relay apparatus carrying out flow identification based on an entry of a flow table describing a pattern of a packet as a subject of flow identification, comprising the steps of judging whether a new pattern to be registered in the flow table is an incremental pattern, that is, a difference with a flow identification pattern of the entry is one bit; changing a mask pattern of the entry indicating a position of a "don't care bit" in relation with the flow identification pattern in flow identification if the new pattern is an incremental pattern; and additionally registering the new pattern in the flow table as an entry if the new pattern is not an incremental pattern.

Also, the entry compression/decompression method of the present invention preferably further comprises the steps of decompressing a compressed entry among the registered entries, deleting an entry indicating a release pattern and an entry corresponding to the release pattern among the decompressed entries, sorting remaining entries, and instructing a re-registration in the sorted sequence when the number of entries registered in the flow table reaches at no less than a predetermined value.

Also, the entry compression/decompression method of the present invention preferably further comprises the steps of dividing the number of remaining entries allowed to be registered by a speed of registering entries per certain time, and if a value calculated by the division satisfies a predetermined condition, comprising the steps of decompressing a compressed entry among the registered entries, deleting an entry indicating a release pattern and an entry corresponding to the release pattern among the decompressed entries, sorting remaining entries, and instructing a re-registration in the sorted sequence, in the step of additionally registering the new pattern in the flow table as an entry.

Also, the entry compression/decompression method of the present invention preferably further comprises the step of, when deleting a specific pattern from the entry of the flow table, registering an entry including a flag indicating that a pattern is not used for flow identification if the pattern exists in a compressed entry.

And the entry compression/decompression method of the present invention preferably further comprises the steps of, if the number of entries included in a compressed entries becomes "1", decompressing the compressed entry, and deleting an entry indicating a release pattern and an entry corresponding to the release pattern among the compressed entries if the number of entries included in compressed entries becomes "1".

The present invention is contrived to make it possible to retain a large volume of patterns constituting a subject of flow identification.

BRIEF DESCRIPTION OF THE DRAWINGS

FIG. 4 is a block diagram of a packet relay apparatus according to a first embodiment of the present invention;

FIG. 5 is a block diagram of a CPU process unit;

FIG. 6 is a diagram exemplifying a flow table according to a first embodiment of the present invention;

FIG. 14 is a detail flow chart of a compression registration process;

FIG. 18A is a diagram exemplifying a flow table;

FIG. 18C is a diagram exemplifying a flow table; and

DESCRIPTION OF THE PREFERRED EMBODIMENTS

Figure 1:
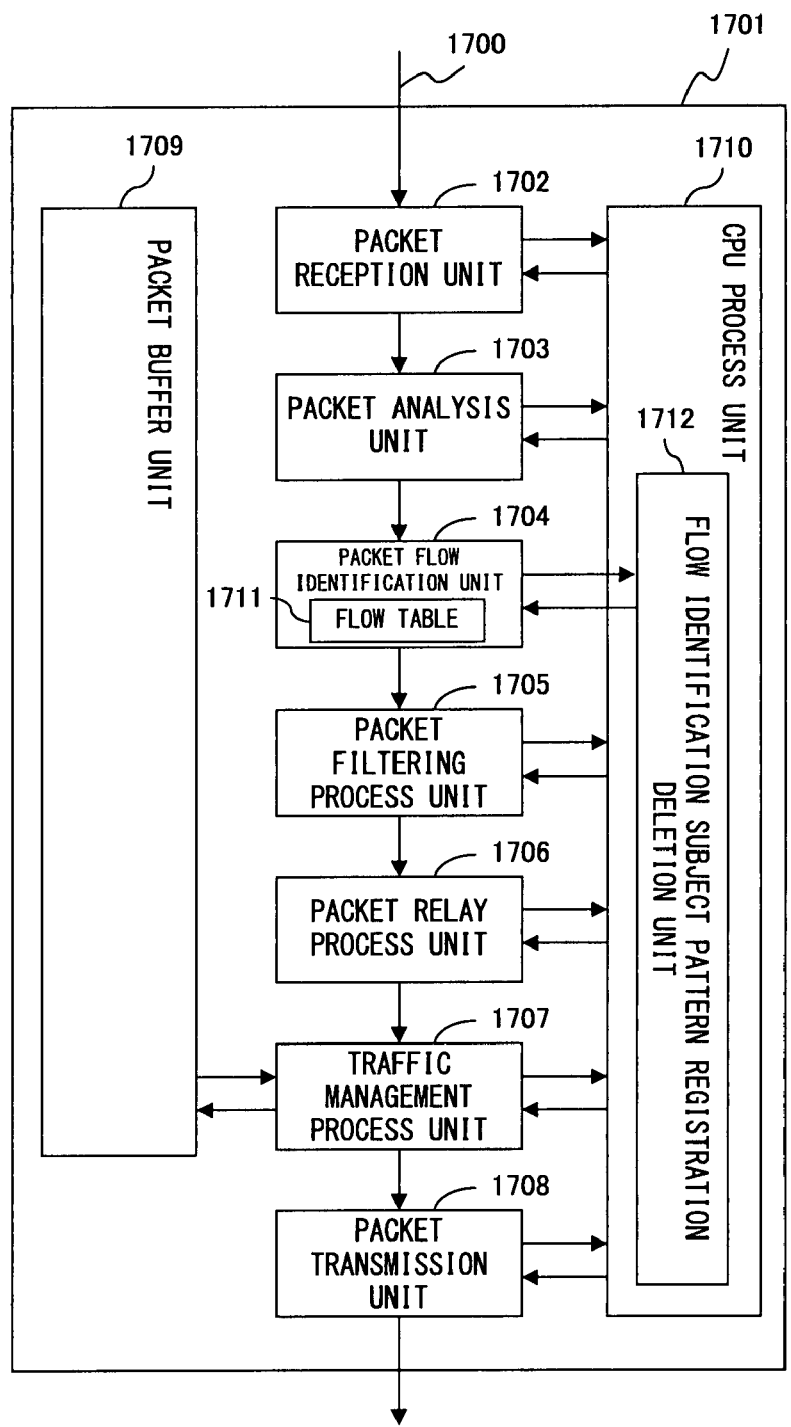
FIG. 1 is a block diagram of a conventional packet relay apparatus.
Figure 2:
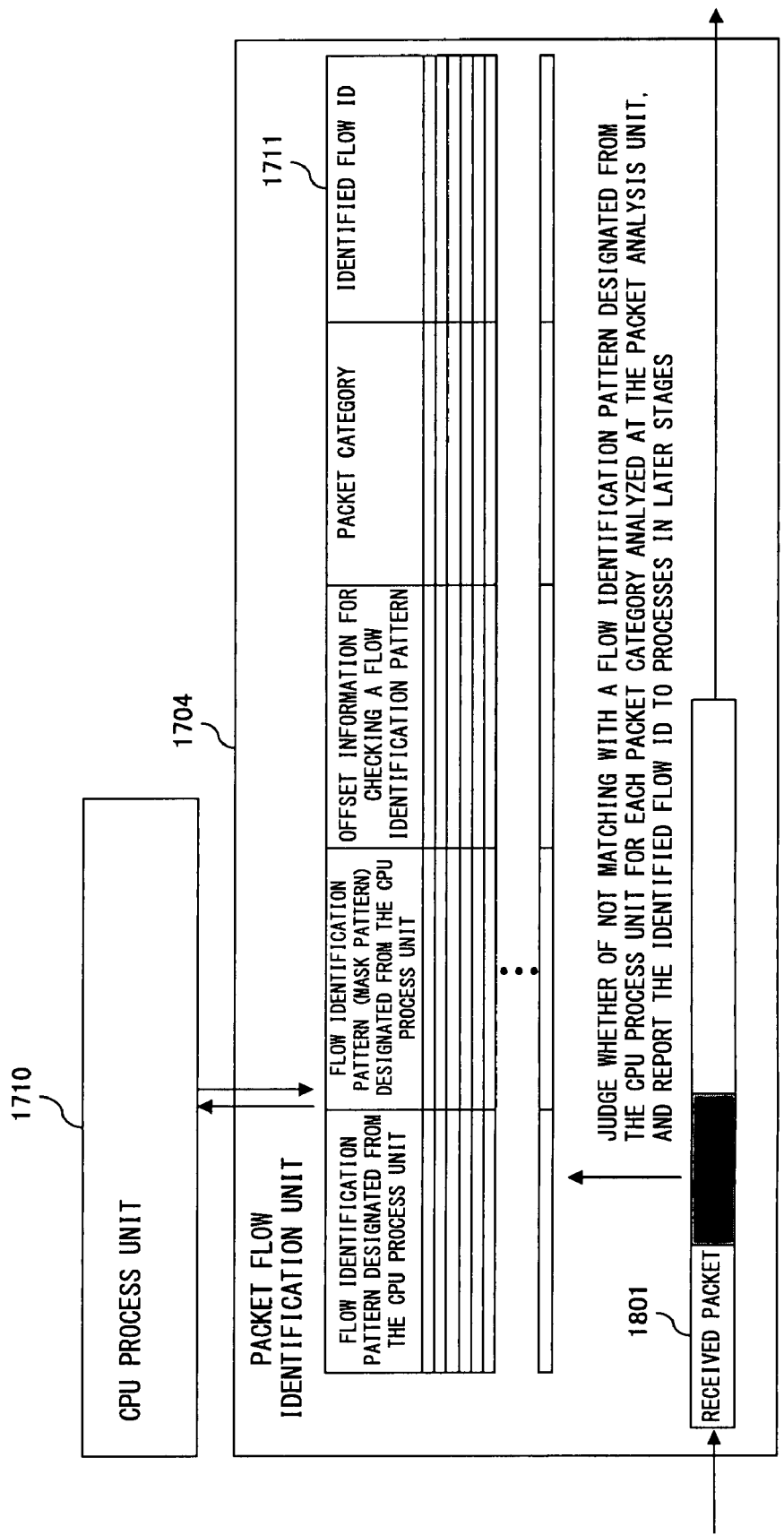
FIG. 2 is a diagram of a detail of a packet flow identification unit of a conventional packet relay apparatus.
Figure 3:
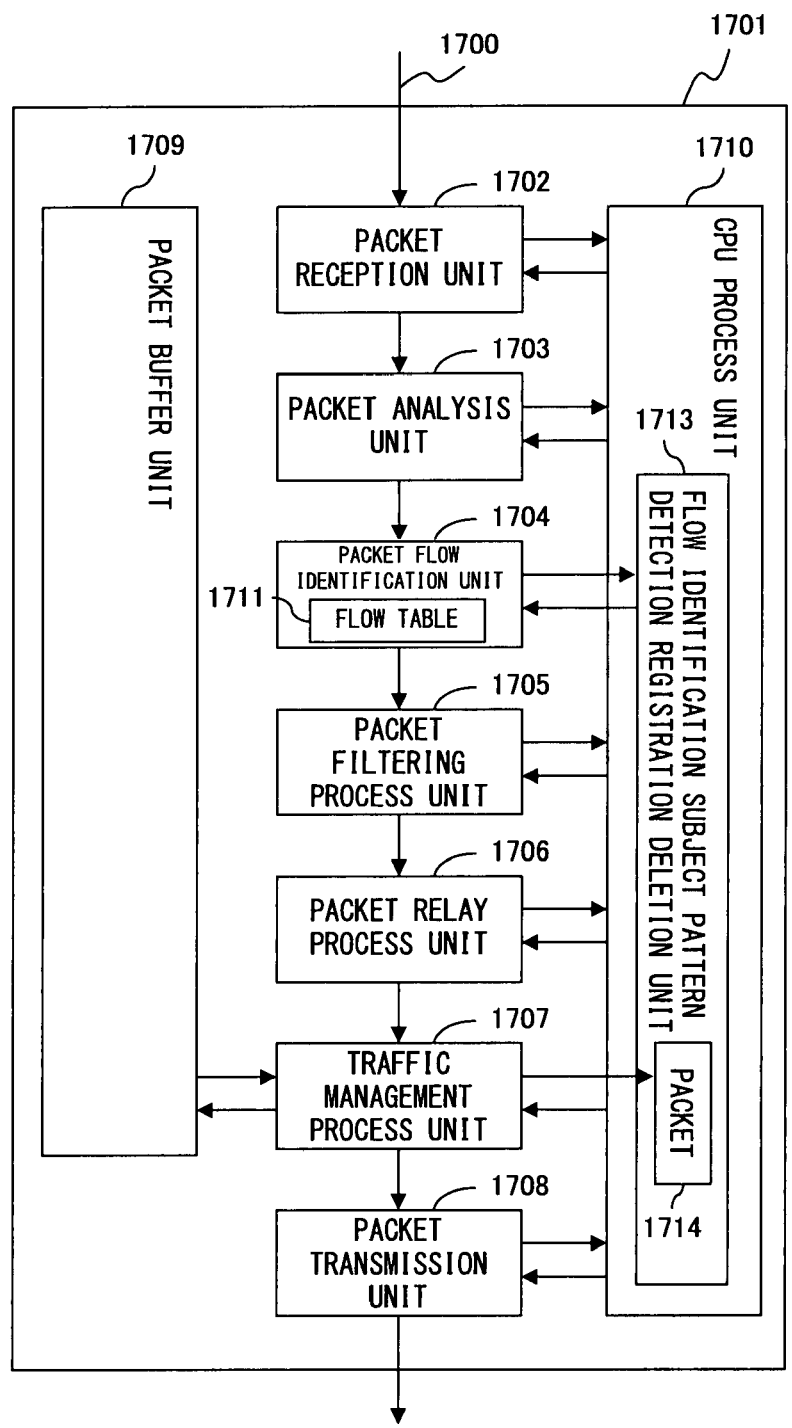
FIG. 3 is a block diagram of a conventional packet relay apparatus.

FIG. 4 is a block diagram of a packet relay apparatus according to a first embodiment of the present invention.

The packet relay apparatus 101, being placed between networks such as a local area network (LAN) and wide area network (WAN), performs a filtering, a provision of QoS, et cetera.

The packet relay apparatus 101 comprises a packet reception unit 102, a packet analysis unit 103, a packet flow identification unit 104, a packet filtering process unit 105, a packet relay process unit 106, a traffic management process unit 107, a packet transmission unit 108, a packet buffer unit 109 and a CPU process unit 110, with the individual constituent units being interconnected by a bus.

The packet flow identification unit 104 comprises a flow table 111. A pattern possessed by a packet constituting a subject of flow identification is described in the flow table 111.

The CPU process unit 110 comprises a dynamic entry compression/decompression unit 112 and a flow identification subject pattern detection registration deletion unit 113.

The configuration of the packet relay apparatus 101 according to the first embodiment of the present invention differs from the conventional packet relay apparatus where the CPU process unit 110 further comprises a dynamic entry compression/decompression unit 112. A registration or deletion of an entry to or from the flow table 111 is carried out by way of the dynamic entry compression/decompression unit 112, thereby enabling a compression or decompression of the entry.

The packet reception unit 102 receives a packet from the line 100 connected to a network.

The packet analysis unit 103 analyzes a packet header of the received packet and identifies a packet category (as to a position of the packet where which information is located).

The packet flow identification unit 104 identifies what kind of process the packet is to be applied at the packet relay apparatus 101 based on information obtained at the packet analysis unit 103 and on the flow table 111 within the packet flow identification unit 104 describing a pattern possessed by a packet constituting a subject of flow identification described by the CPU process unit 110. As an example, it judges an appropriateness of applying a packet filtering and QoS.

The packet filtering process unit 105 discards an unnecessary packet based on the information obtained from the packet flow identification unit 104.

The packet relay process unit 106 carries out, for example, the process for identifying a transmission destination based on path information obtained from the CPU process unit 110, and the process for judging whether or not to transmit a copy of the packet to the CPU process unit 110 based on the identification result of the packet flow identification unit 104.

The traffic management process unit 107 manages a priority control and a band control, such as providing a QoS corresponding to the identification result of the packet flow identification unit 104. It also transmits a copy of the packet to a flow identification subject pattern detection registration deletion unit.

The packet transmission unit 108 transmits a packet to the line.

The packet buffer unit 109 makes a packet stay for providing a QoS if a transmission line is congested.

The CPU process unit 110 carries out a soft relay process for a packet not allowing a hard relay process and a table management process such as a path information management and a flow identification information management.

The dynamic entry compression/decompression unit 112 carries out a compression, decompression, registration and deletion of an entry of the flow table.

The flow identification subject pattern detection registration deletion unit 113 checks a packet received from the traffic management process unit 107, judges whether a specific pattern is to be constituted a subject of filtering, et cetera, and instructs the dynamic entry compression/decompression unit for registering or deleting a specific pattern.

FIG. 5 is a block diagram of the CPU process unit 110.

The flow identification subject pattern detection registration deletion unit 113 comprises a security process unit 201; and the dynamic entry compression/decompression unit 112 comprises a pattern registration process unit 202, an average entry registration speed measurement unit 203, a registration entry number management unit 204, an entry deletion process unit 205, a deletion timer value update unit 206, an entry compression/decompression process unit 207, and a mirror table management unit 208. The pattern registration process unit 202 comprises an incremental pattern judgment unit 209.

The security process unit 201 carries out a series of security checks on the received packet, and judges flow identification (i.e., an entry registration) of a packet having a specific pattern and a flow identification release (i.e., an entry deletion).

The pattern registration process unit 202 and incremental pattern judgment unit 209 judge whether the specific pattern obtained from the security process unit 201 is an incremental pattern to the flow identification pattern of the entry already registered in the flow table 111 and, if it is an incremental pattern, instructs the entry compression/decompression process unit 207 for carrying out a compressed registration of the specific pattern, and instructs it for carrying out a normal registration if the specific pattern is not an incremental pattern. An incremental pattern is defined as a pattern of which a difference with a certain pattern is one ("1") bit.

If the pattern registration process unit 202 and incremental pattern judgment unit 209 have instructed for carrying out a compression registration, the deletion timer value update unit 206 is instructed for updating a deletion timer value.

If the two units 202 and 209 have instructed for a normal registration, they set a deletion timer value anew for the registration entry and further notify the average entry registration speed measurement unit 203 and registration entry number management unit 204 of the event of registering an entry.

The average entry registration speed measurement unit 203 manages the number of registration entries per unit time, and issues an instruction to the entry compression/decompression process unit 207 for compressing an entry within the table if a value of the number of remaining entries divided by the average entry registration speed becomes less than a designated threshold value. Note that the number of remaining entries is a result of subtracting the number of currently registered entries from the number of entries retainable by the flow table, and the average entry registration speed is the number of registrations of entries to the flow table per unit time.

The registration entry number management unit 204 manages the number of registration entries and issues an instruction to the entry compression/decompression process unit 207 for compressing an entry within the table. It also compresses a release pattern indicating not making a subject of flow identification.

The entry deletion process unit 205 instructs a deletion of an entry designated by the security process unit 201 and deletion timer value update unit 206. It also notifies the registration entry number management unit 204 of the event of deleting the entry.

The deletion timer value update unit 206 sets a timer to an initial value designated at the time of registering an entry, and instructs the entry deletion process unit 205 for deleting the applicable registration entry if the timer is expired without it being updated. The update of the deletion timer to the initial value is carried out at the time of compression-registering an incremental pattern and of compressing an entry. It is also possible to configure not to be deleted by a deletion timer value.

The entry compression/decompression process unit 207, receiving an instruction from the pattern registration process unit 202 for registering an incremental pattern, or receiving an instruction for compressing an entry from the registration entry number management unit 204 or average entry registration speed measurement unit 203, makes a compressed entry by using a mirror table having a similar content to the flow table 111, registers the compressed entry and deletes an entry which has become unnecessary due to the compression.

Also, the entry compression/decompression process unit 207, receiving an instruction from the entry deletion process unit 205 for deleting an entry, adds an entry of which the release flag of an item is "1" if the instruction is to delete a pattern within the compressed entry, while if the number of release patterns is the number of compressed entries minus "1", the entry compression/decompression process unit 207 decompresses the compressed entry and deletes a release pattern of which the release flag is "1"and an entry corresponding to the release pattern. The entry corresponding to a release pattern is defined as entry having the same flow identification pattern as a release pattern.

The mirror table management unit 208 has a mirror table of the same contents as the flow table possessed by the packet flow identification unit 104.

FIG. 6 is a diagram exemplifying a flow table according to the first embodiment of the present invention.

As described above, the flow table 111 exists within the packet flow identification unit 104 which carries out flow identification based on the flow table 111 and information from the packet analysis unit 103.

Items in the flow table 111 includes a flow identification pattern, a mask pattern, comparison position (offset) information, a packet category, a flow ID, the number of compressed entries, the number of release patterns, a deletion timer value and a release flag.

The flow identification pattern normally describes a pattern possessed by a pattern which is desired to apply a specific process. In the flow table 111, MAC address is noted as a flow identification pattern, with 00000e000001 being noted as the flow identification pattern of the first line entry (i.e. the first entry) and 00000e000002 being noted as the flow identification pattern of the second line entry (i.e., the second entry). Note that the flow table 111 notes the respective values by the expression of hexadecimal. For simplicity of description, the following description sometimes omits the upper eleven digits of the 00000e000001 and 00000e000002 to express "1"and "2", respectively. And it also sometimes expresses 0001 and 0010 by binary-converting 1 and 2, respectively.

The mask pattern notes a pattern specifying a position of a "don't care bit" relative to the flow identification bit. That is, the position of a bit which is capable of taking an arbitrary logical value.

The first embodiment of the present invention is configured in such a manner that the bit of the position of "0" among the mask pattern constitutes a "don't care bit". In the flow table 111, noted are ffffffffffff as the mask pattern of the first line entry (i.e., the first entry) and fffffffffffe as the mask pattern of the second line entry (i.e., the second entry). Expressing the f in the binary number, it becomes 1111 and therefore a designation of a "don't care bit" does not exist. Therefore, omitting the upper eleven digits for simplicity of description, the mask pattern of the first entry is "f" and that of the second entry is "e". Then, expressing the f and e in the binary number, they become 1111 and 1110, respectively.

The entire mask pattern of the first entry is "1", and therefore a designation of a "don't care bit" does not exist.

Meanwhile, the mask pattern of the second entry is "e", that is, 1110, and therefore the lowest bit constitutes a "don't care bit". Considering that the flow identification pattern of the second entry is "2", that is, 0010, and therefore the lowest bit constitutes a "don't care bit", the state becomes similar to the 0010 and 0011 being registered in the flow identification pattern, thus the two patterns becoming subjects of flow identification. That is, the entries of which the flow identification pattern are 0010 and 0011 are compressed. As such, the use of a mask pattern makes it possible to compress a plurality of entries into one entry and accordingly save memory volume.

The comparison position (offset) information notes a comparison position of a received packet to be compared with the flow identification pattern. The flow table 111 of FIG. 6 notes "0"as comparison position (offset) information. This indicates an event of comparing with the head of the packet. That is, it means an event of comparing with a destination MAC address in the case of a packet based on the structure of an Ethernet frame. As an example, if a "6"is noted as comparison position (offset) information, the event is to compare the flow identification pattern with a source MAC address.

The packet category notes a category of a packet. The flow table 111 notes No tag and IP. The preferred embodiment is configured to compare a position of the comparison position (offset) information of the received packet with the flow identification pattern, in which there is a problem of the comparison position being displaced by four (4) bytes depending on the presence or absence of a TAG if a comparison with an IP address is desired for example, in place of a MAC address. Therefore, the configuration is in a manner to enable a correct detection by adding the presence or absence of information and protocol information of a TAG to the detection condition.

The flow ID notes an ID for identifying a packet at the packet relay apparatus. The flow ID is information added to a packet for identifying the category of the packet at a later stage process.

The number of compressed entries notes the number of compressed entries in the present entry. In the flow table 111, the number of compressed entries of the first entry is "0". This is because there is no compressed entry. A "1", in place of "0", may be used for indicating that there is no compressed entry.

As described above, two entries of which the flow identification patterns are 0010 and 0011 are registered by being compressed in the second entry. Therefore, the number of compressed entries of the second entry is "2".

The number of release patterns notes the number of released patterns among the registered compressed entries. The released pattern (i.e., the release pattern) is defined as a pattern not constituting a subject of flow identification.

The deletion timer value notes a timer value until an entry is deleted. Upon elapse of a certain time length after registering an entry, a packet possessing the flow identification pattern of the entry is no longer sent, and therefore the entry is no longer necessary. The first preferred embodiment of the present invention is accordingly configured to set a deletion timer value and then delete the entry to which the deletion timer value is set upon expiration of the timer value.

In the flow table 111, the deletion timer value of the first entry is fffffff0, and that of the second entry is ffffffff.

The first embodiment of the present invention is configured to set an ffffffff at the time of setting a deletion timer value, followed by subtracting the timer value. As an example, when the timer value becomes a 00000001 as a result of subtracting the timer value, an expiration of the timer is judged. An alternative configuration may be such that an entry is not deleted by a timer value if a 00000000 is set to the timer value.

The release flag notes "0" or "1". This is for judging whether or not the entry is a subject of flow identification. The first embodiment of the present invention is configured to put an entry registered in the upper part of the flow table in higher priority, and therefore, a flow identification pattern does not constitute a subject of flow identification even if there is an entry possessing the same flow identification pattern as the flow identification pattern of an entry being in a lower part if the immediately aforementioned entry of which a release flag is "1" is in the upper part.

Figure 7:
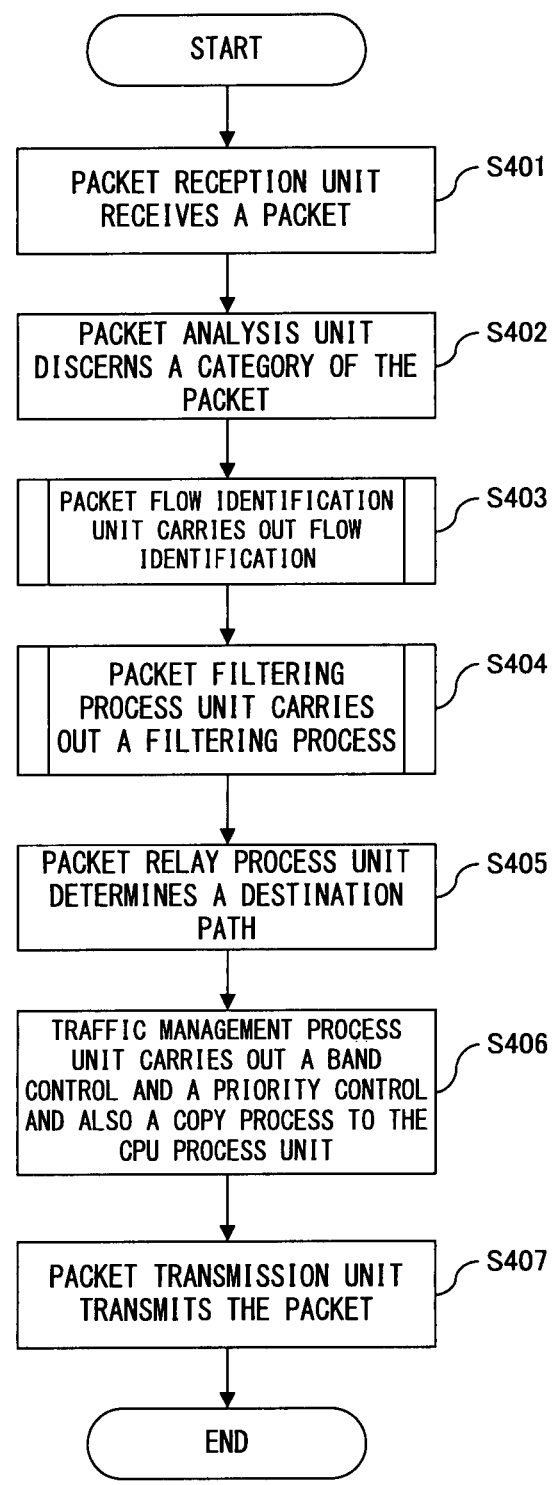
FIG. 7 is a flow chart showing a flow of a process at the packet relay apparatus according to the first embodiment of the present invention.

FIG. 7 is a flow chart showing a flow of a process at the packet relay apparatus according to the first embodiment of the present invention.

The following is a description of an operation when the packet relay apparatus has received one packet.

In the step S401 (sometimes abbreviated as "in S401" hereinafter), the packet reception unit 102 receives a packet.

In S402, the packet analysis unit 103 analyzes the packet header of the received packet and identifies a packet category (as to a position of the packet where which information is located).

In S403, the packet flow identification unit 104 identifies what kind of process is to be applied to the packet at the packet relay apparatus 101 based on the information obtained at the packet analysis unit 103 and the information obtained at the CPU process unit 110. As an example, it judges the appropriateness or not of applying a packet filtering and a quality of service (QoS). Note that a detail of a process at the packet flow identification unit 104 is described later.

In S404, the packet filtering process unit 105 carries out a filtering process, that is, discards an unnecessary packet, based on the information obtained from the packet flow identification unit 104. Note also that a detail of a process at the packet filtering process unit 105 is described later.

In S405, the packet relay process unit 106 carries out, for example, the process of identifying a transmission destination based on the information obtained from the CPU process unit 110 and the process of judging a transmission of a copy of the packet to the CPU process unit 110 based on the identification result of the packet flow identification unit 104.

In S406, the traffic management process unit 107 manages a priority control and a band control, such as a provision of a QoS corresponding to the identification result of the packet flow identification unit 104. It also transmits the packet to the packet transmission unit 108 and CPU process unit 110. Note that a process of a packet at the CPU process unit 110 is described later.

In S407, the packet transmission unit 108 transmits the packet.

The next is a description of a detail of a process at the packet flow identification unit 104 in the step S403.

Figure 8:
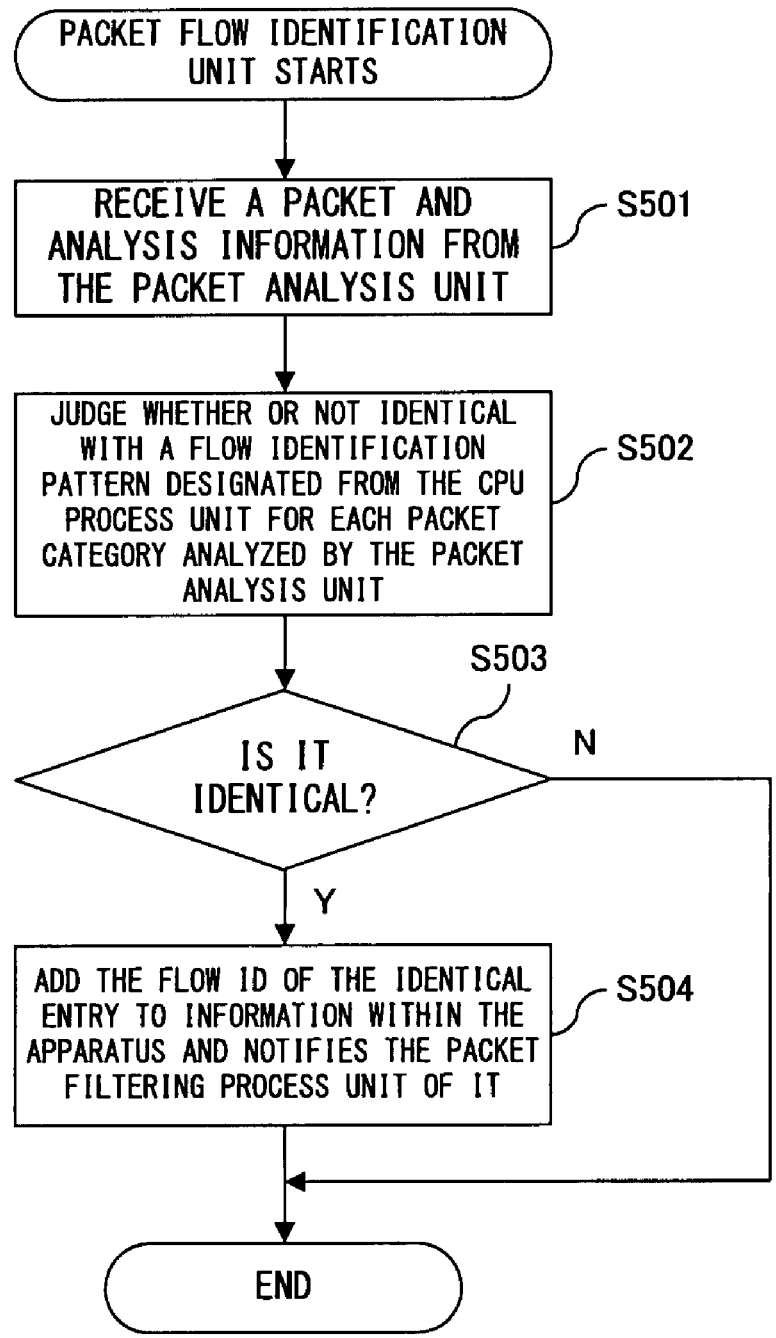
FIG. 8 is a flow chart showing a flow of a process at a packet flow identification unit of a packet relay apparatus according to the first embodiment of the present invention.

FIG. 8 is a flow chart showing a flow of a process at the packet flow identification unit of the packet relay apparatus according to the first embodiment of the present invention.

In the step S501, the packet flow identification unit 104 receives the packet and analysis information from the packet analysis unit 103.

In S502, it judges whether or not identical with a flow identification pattern designated from the CPU process unit 110 for each packet category analyzed by the packet analysis unit 103.

In S503, if they are identical, the process shifts to S504, while if they are not identical, the process ends.

In the S504, it adds the flow ID of the identical entry to information within the apparatus and notifies the packet filtering process unit 105 of it. The flow ID is then used for packet identification for a filtering process, band control and priority control.

The next is a description of a detail of a process at the packet filtering process unit 105 in the step S404.

Figure 9:
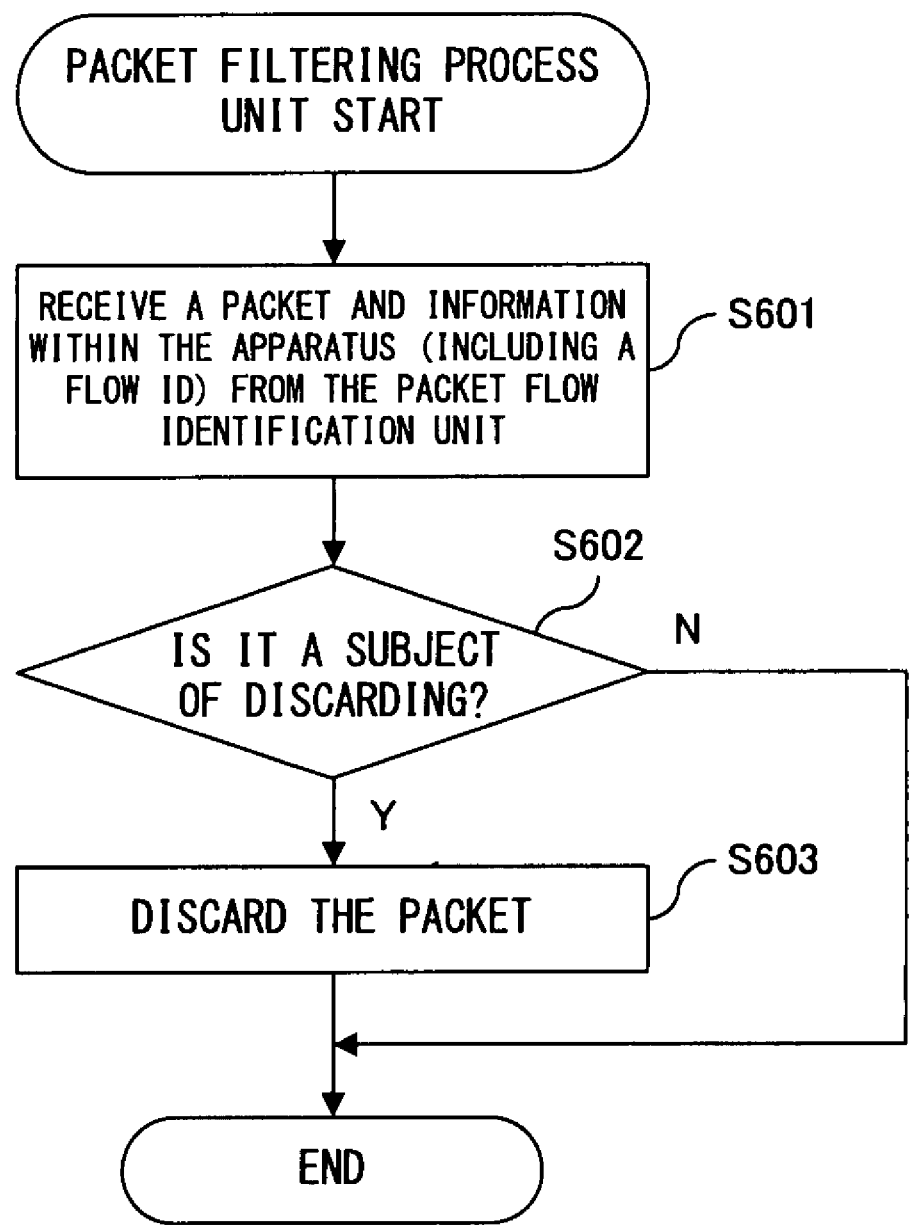
FIG. 9 is a flow chart showing a flow of a process at a packet filtering process unit of a packet relay apparatus according to the first embodiment of the present invention.

FIG. 9 is a flow chart showing a flow of a process at the packet filtering process unit of the packet relay apparatus according to the first embodiment of the present invention.

In the step S601, the packet filtering process unit 105 receives the packet and information within the apparatus (including the flow ID) from the packet flow identification unit 104.

In S602, it judges whether the packet is a subject of discarding by referring to the flow ID attached to the packet and, if the packet is the subject of discarding, the process proceeds to S603, otherwise the process ends.

In S603, it discards the packet.

The next is a description of a process at the CPU process unit 110 which has received the packet transmitted in the step S406.

Figure 10:
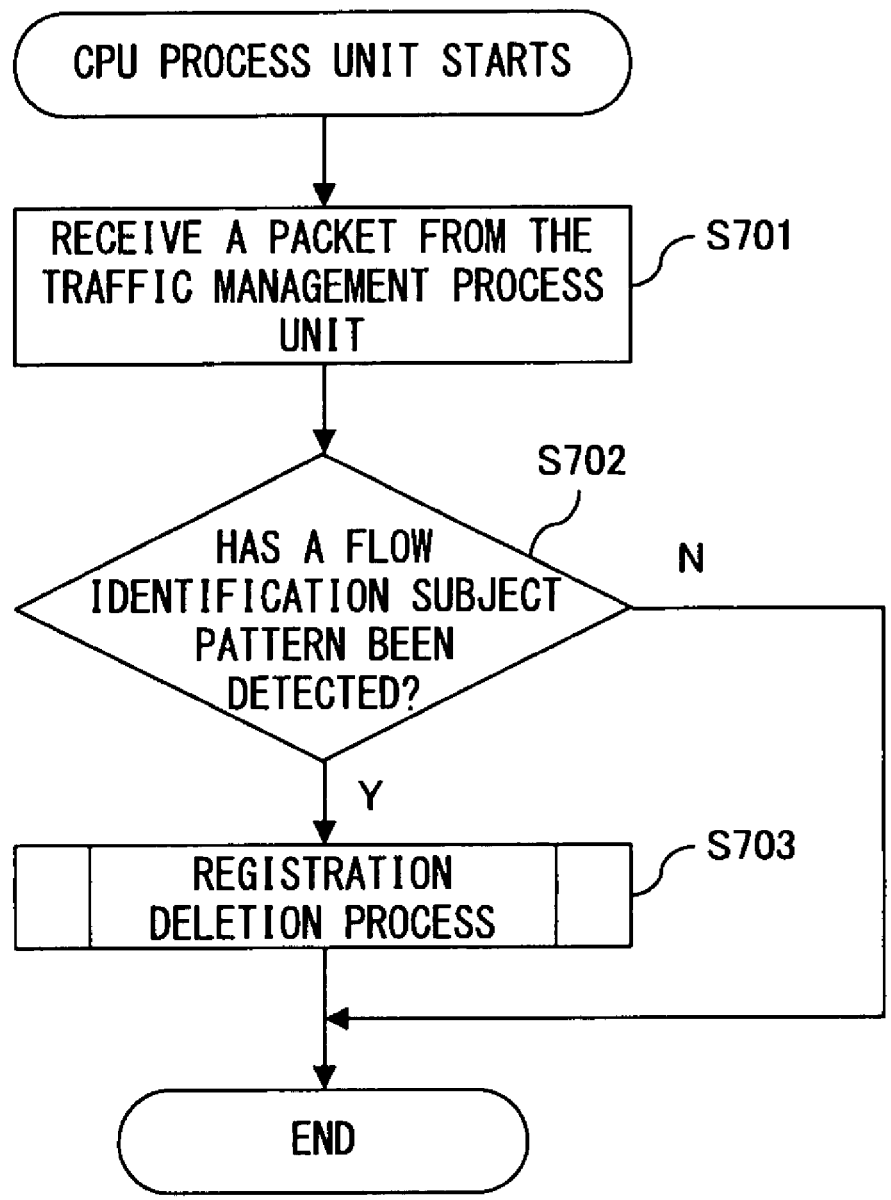
FIG. 10 is a flow chart showing a flow of a process at a CPU process unit of a packet relay apparatus according to the first embodiment of the present invention.

FIG. 10 is a flow chart showing a flow of the process at a CPU process unit of the packet relay apparatus according to the first embodiment of the present invention.

In the step S701, the CPU process unit 110 receives the packet transmitted from the traffic management process unit 107.

In S702, the security process unit 201 carries out a series of security check of the received packet and judges whether or not a packet possessing a specific pattern is one constituting a subject of a filtering. The method for the security check uses a discretionary method such as judging from the port number used by the packet, et cetera. There are conventionally known methods.

In S703, the CPU process unit 110 carries out a registration deletion process of the specific pattern possessed by the packet constituting a subject of a filtering.

The next is a description of a detail of the registration deletion process carried out in the step S703.

Figure 11:
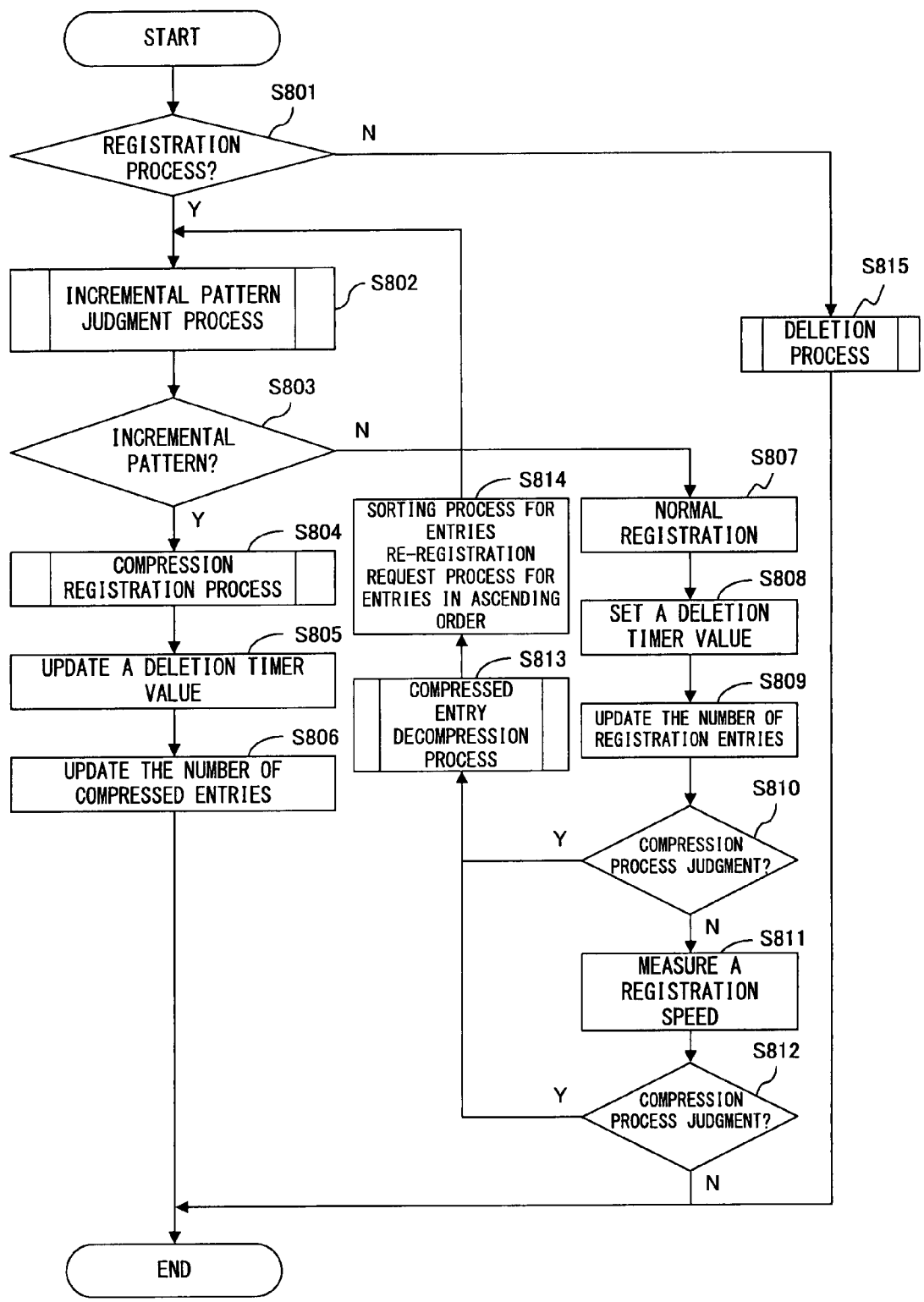
FIG. 11 is a detail flow chart of a registration deletion process.

FIG. 11 is a detail flow chart of the registration deletion process.

In the step S801, the process shifts to S802 in the case of a registration process, while the process shifts to S815 otherwise, that is, in the case of a deletion process.

In S802, judged is whether a pattern to be registered (i.e., a new pattern) is an incremental pattern. The judgment process for judging whether a pattern is an incremental pattern is described later.

In S803, if the new pattern is an incremental pattern, the process shifts to S804, otherwise the process shifts to S807.

In S804, a compression registration process is carried out, of which a detail of the process for an entry is described later.

In S805, the deletion timer value update unit 206 updates a deletion timer of an entry.

In S806, the number of compressed entries is obtained from the mask pattern of the entry and updates the number of compressed entries.

In S807, a normal registration process is carried out. That is, an entry possessing a new pattern is added to the flow table as a flow identification pattern.

In S808, the deletion timer value update unit 206 sets a deletion timer value of the registered entry.

In S809, the registration entry number management unit 204 updates the number of registration entries to the number of entries currently registered in the flow table.

In S810, the registration entry number management unit 204 judges whether or not to compress the entry. In specific, the process shifts to S813 for carrying out a compression registration if the number of registration entries is no less than a predetermined number (i.e., a registration number threshold value), otherwise the process shifts to S811.

Figure 12:
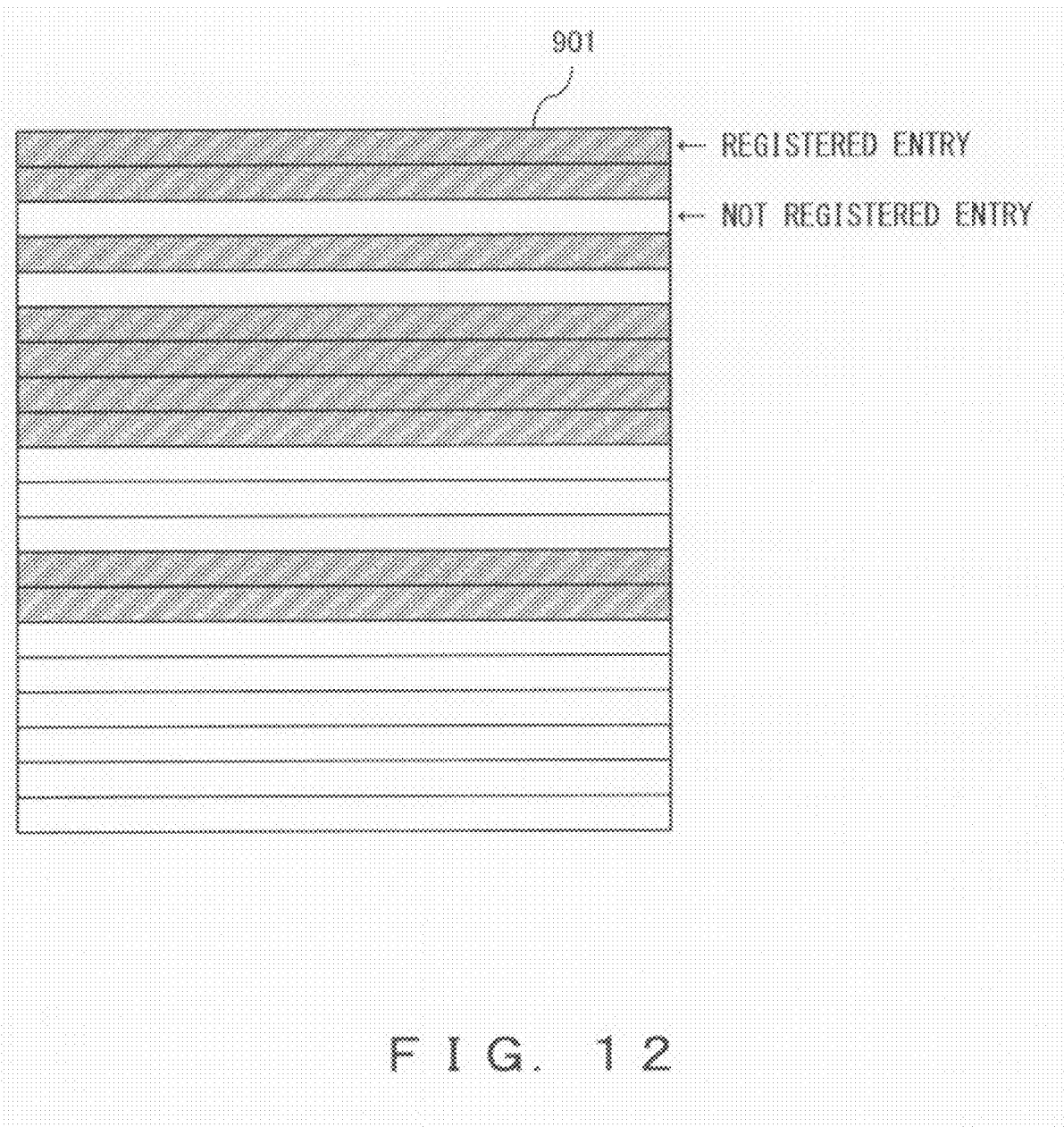
FIG. 12 is a diagram for describing an example of a compression process judgment.

FIG. 12 is a diagram for describing an example of a compression process judgment.

Referring to FIG. 12, it is for example assumed that the memory table 901 has the total number of entries allowing registration as twenty (20). In the memory table 901, the shaded part indicates the fact of an entry being already registered, and the white part indicates the fact of an entry not being registered. Here, nine entries are registered. Another assumption is that the registration number threshold value is ten (10).

In this case, the number of registered entries becomes ten when a new entry is registered, resulting in being no less than the registration number threshold value, and therefore the registration entry number management unit 204 judges for a compression of the registered entry (i.e., the process proceeds to the S813). As such, when entries of no less than a certain number thereof are registered, a compression process of a registered entry is carried out.

In the step S811, the average entry registration speed measurement unit 203 measures the number of registered entries per unit time (i.e., an average entry registration speed).

In S812, the average entry registration speed measurement unit 203 judges whether or not to compress an entry. In specific, the average entry registration speed measurement unit 203 calculates a value (i.e., a degree of registration margin) of a result of dividing the number of remaining entries (i.e., the number of total entries minus the number of currently registered entries) by the average entry registration speed, and compares the resultant with a predetermined value (i.e., a threshold value).

If the degree of registration margin is less than the threshold value, the process proceeds to the S813, otherwise the process ends.

As an example assumption, the threshold value is set at five (5) and the average entry registration speed is the number of registrations per second. Then, if four entries per second is registered in the state of a registration entry being zero, the degree of registration margin is four (4) (=the number of remaining entries divided by the average entry registration speed=16/4=4). Accordingly, the judgment of the average entry registration speed measurement unit 203 is to compress the entry (i.e., proceeding to the S813) because the degree of registration margin is less than the threshold value. Also, if four entries are registered in the speed of one entry per second in the state of a registration entry being zero, the degree of registration margin is sixteen (16) (=16/1=16). Therefore, the judgment of the average entry registration speed measurement unit 203 is that a registration entry is not compressed. As such, a compression process for the registration entry is carried out in the case of increasing the number of registration entries per unit time relative to the number of remaining entries.

In the S813, an entry (or entries) retained by the mirror table management unit 208 is decompressed. A detail of the decompression process for an entry is described later.

In S814, the entries decompressed in the S813 are sorted. The sorting is carried out by a pair of entries having the common values of offset information, packet category, flow ID and release flag, and sorted in an ascending order of the flow identification pattern. Then, a registration request process for entries is carried out in the sequence of the sorting, and the process shifts to the S802. The decompression and sorting for the compressed entries are carried out by using a table of the mirror table management unit 208 of the CPU process unit 110. After a re-registration, the contents of the table of the mirror table management unit 208 are written to the flow table of the packet flow identification unit 104.

In S815, carried out is a deletion process for an entry including a requested identification flow pattern. Note that a detail of the deletion process is described later.

The next is a description on the incremental pattern judgment process of the step S802.

Figure 13:
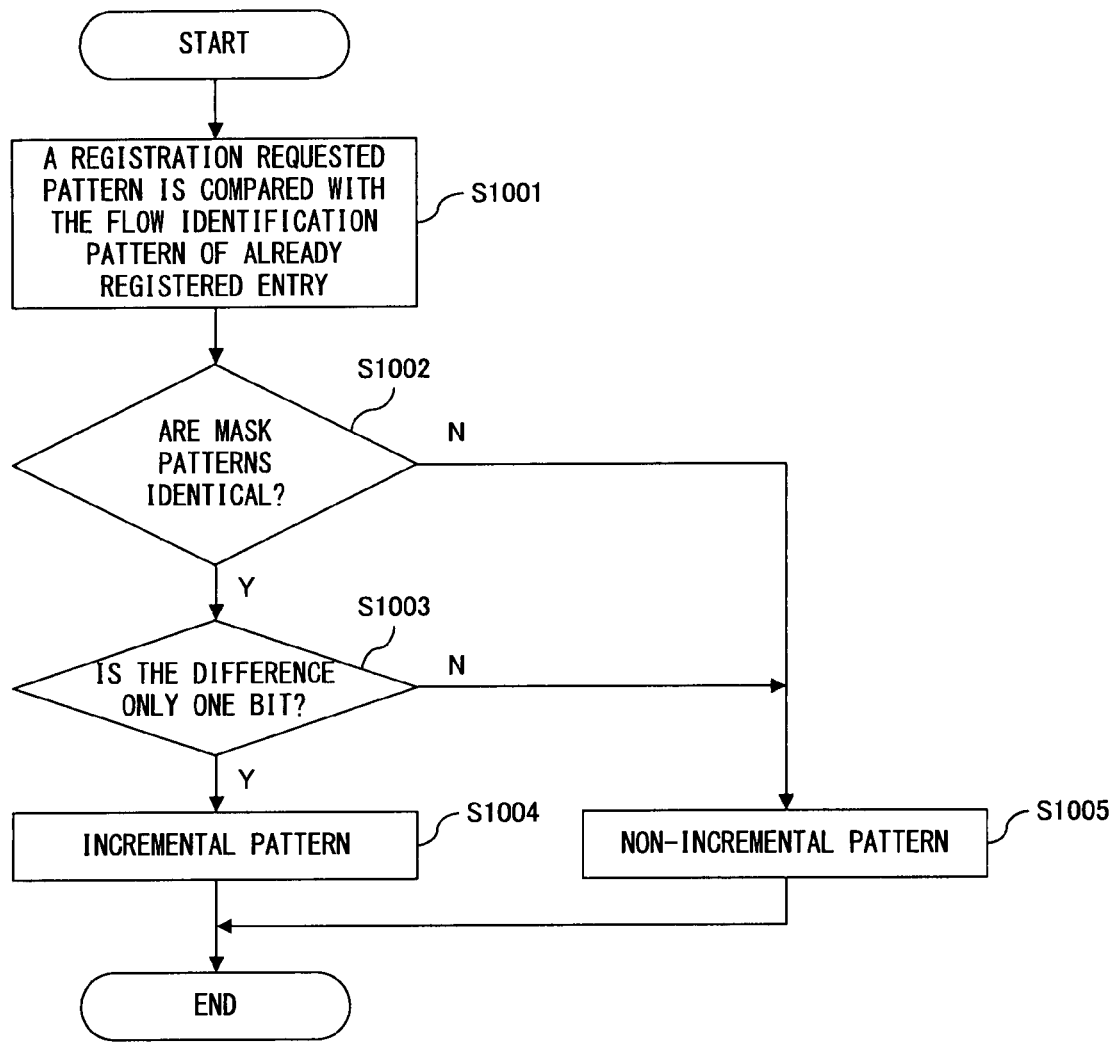
FIG. 13 is a detail flow chart of an incremental pattern judgment process.

FIG. 13 is a detail flow chart of the incremental pattern judgment process.

In the step S1001, a new pattern to be registered in the flow table is compared with the flow identification pattern of the already registered entry. Here, the latest registration entry is handled as a subject of comparison in the case of a process proceeding from the S802, while all registered entries are handled as subject of comparison in the case of a process proceeding from the S814.

In S1002, if both mask patterns are identical, the process proceeds to S1003, while if they are not identical the process proceeds to S1005. Meanwhile, a new pattern has no "don't care bit", and therefore all the mask pattern of the new pattern is "1". Therefore, it may be appropriate to judge by whether or not the mask patterns of the registered entries are all "1". That is, if the mask patterns of the registered entries are all "1", the process shifts to S1003, otherwise the process shifts to the S1005.

In the S1003, if the difference between the new pattern and the flow identification pattern of the registered entry is one bit, the process proceeds to S1004, otherwise the process proceeds to the S1005.

In the S1004, the new pattern is judged to be an incremental pattern.

In the S1005, the new pattern is judged to be a non-incremental pattern.

The description here is the case of registering a new pattern 0001 as an example. Since the new pattern has no bit designated as a "don't care bit", the mask pattern is 1111. The assumption here is that the flow identification pattern of the registered entry and the mask pattern are 0000 and 1111, respectively. The following description expresses a flow identification pattern (a mask pattern) as a collective name for the flow identification pattern and mask pattern for simplicity of description.

In the S1002, comparing the mask patterns of the both with each other, the both are 1111 and therefore the process proceeds to the S1003.

In the S1003, comparing the new pattern 0001 with the flow identification pattern 0000 of the registered entry, only the bit of the lowest one digit is different. That is, the difference is one bit (i.e., one-bit change). Therefore, the process proceeds to the S1004, and the new pattern 0001 is judged to be an incremental pattern.

The next is a description of the case of registering a new pattern 0101 as an example. Since the new pattern has no bit designated as a "don't care bit", the mask pattern is 1111. The assumption here is that the flow identification pattern of the registered entry and the mask pattern are 0000 and 1111, respectively.

In the step S1002, comparing the mask patterns of the both with each other, the both are 1111 and therefore the process proceeds to the S1003.

In the S1003, comparing the new pattern 0101 with the flow identification pattern 0000 of the registered entry, the bits of the lowest one digit and the third digit are different. That is, the difference is two bits (i.e., a two-bit change). The process accordingly proceeds to the S1005 and the new pattern 0101 is judged to be a non-incremental pattern.

The next is a description on the compression registration process of the step S803.

FIG. 14 is a detail flow chart of a compression registration process.

In the step S1101, the mask pattern of an already registered entry is changed so as to designate a bit of a position of the difference between the registration requested pattern and the flow identification pattern of the registered entry which constitutes a subject of comparison in the step S1001 as a "don't care bit".

In S1102, the entry of which the mask pattern is changed, that is, the flow identification information of the compressed entry, is compared with the flow identification information of the one previous entry.

In S1103, the mask pattern of the compressed entry is compared with that of the one previous entry. If these mask patterns are identical, the process shifts to S1104, otherwise the process ends.

In S1104, if the difference between the identification pattern of the compressed entry and the flow identification information of the one previous entry is one bit, the process proceeds to S1105, otherwise the process ends.

In S1105, the mask pattern of the one previous entry is updated so as to designate a bit of the position of the difference as a "don't care bit".

Figure 15:
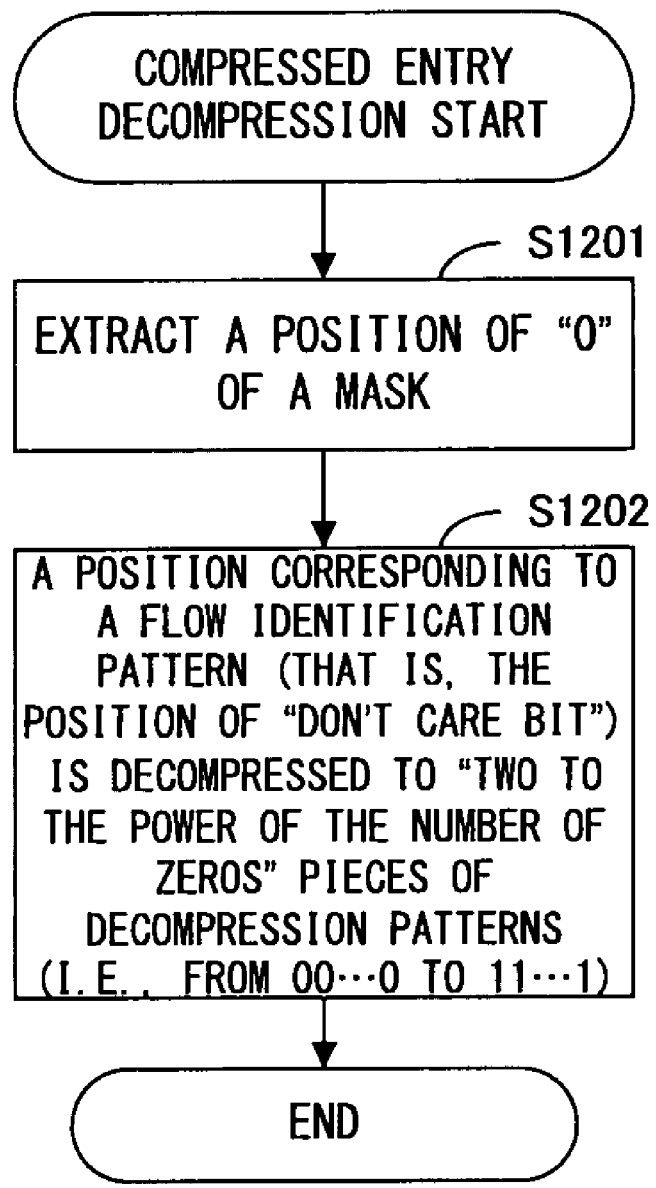
FIG. 15 is a detail flow chart of a compressed entry decompression process.

FIG. 15 is a detail flow chart of a compressed entry decompression process.

In the step S1201, a "0" position of the mask pattern of an entry to be decompressed is detected.

In S1202, a position corresponding to the "0" position of the mask pattern of a flow identification pattern (that is, the position of "don't care bit") is decompressed to "two (2) to the power of the number of zeros of the mask pattern"—pieces of decompression patterns (i.e., from 00 . . . 0 to 11 . . . 1, that is, all the combination of "0" and "1" in the pattern of "the number of zeros (0s) of the mask pattern"—digits).

The following is a description of the case of decompressing an entry of which the flow identification pattern is 00000e000004 and the mask pattern is ffffffffffc as an example.

The following description omits the indication of the upper eleven digits of the flow identification pattern and mask pattern for simplicity. Since the flow identification pattern and mask pattern are 4 and c, respectively, which are 0100 and 1100, respectively, in the expression of the binary number.

In the step S1201, as a position of "0" of the mask pattern is detected, the mask pattern is 1100 and therefore the lowest digit and second digit are applicable.

In S1202, the position of the "don't care bit" of the flow identification pattern is decompressed to "two (2) to the power of the number of zeros"—pieces of expansion patterns. That is, bits of the lowest digit and second lowest digit of the flow identification pattern 0100 are decompressed to 00, 01, 10 and 11. By this, the flow identification pattern is decompressed to four patterns, i.e., 0100, 0101, 0110 and 0111. That is, expressing all digits with the hexadecimal, the entry of which the flow identification pattern is 00000e000004 and the mask pattern is ffffffffffc is decompressed to four entries of which the flow identification patterns are 000000e000004, 00000e000005, 00000e000006 and 00000e000007. Incidentally, the mask pattern of the decompressed entry is ffffffffffff.

Figure 16:
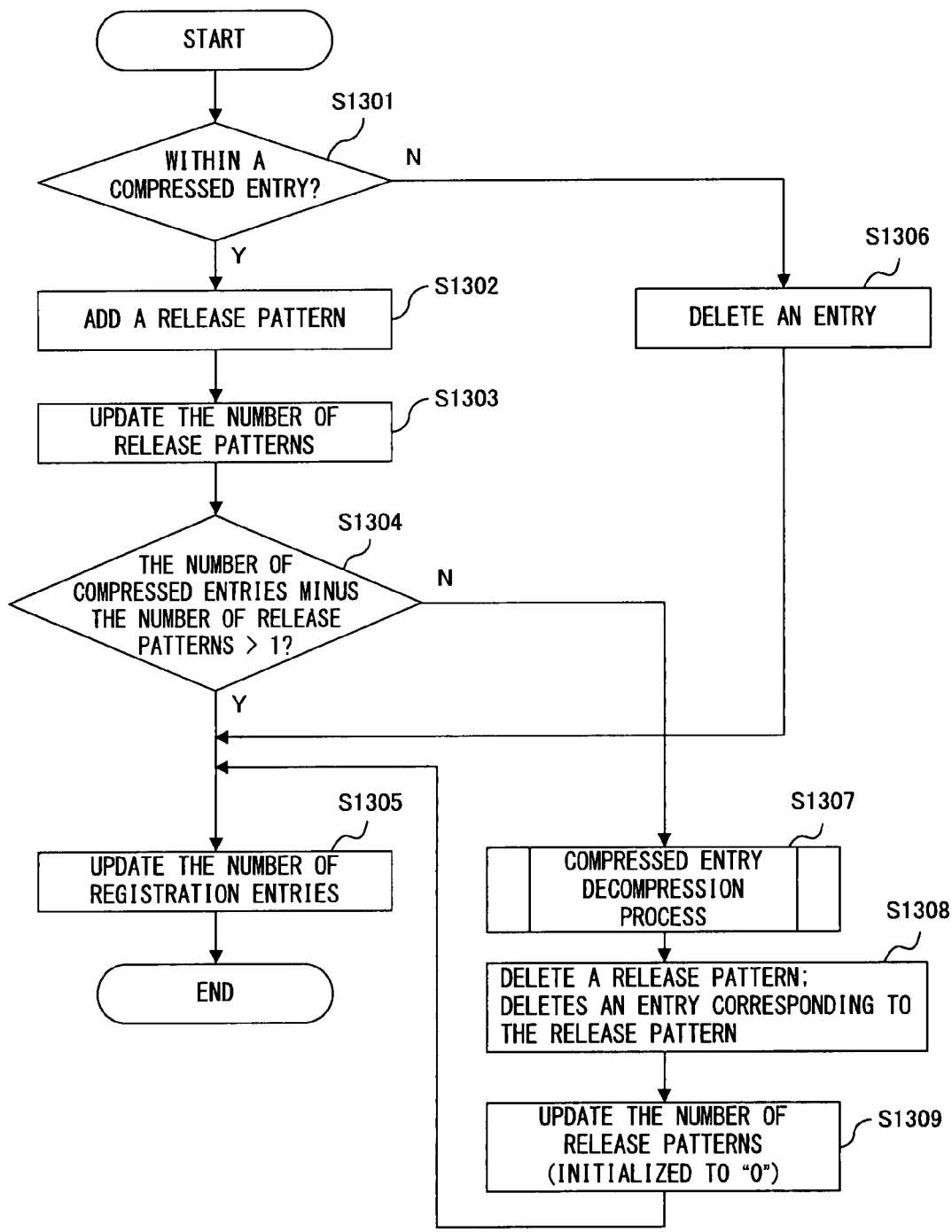
FIG. 16 is a detail flow chart of a deletion process.

FIG. 16 is a detail flow chart of a deletion process.

In the step S1301, judged is whether or not a release pattern, that is, a pattern not used for flow identification, exists in the compressed entry and, if there is one therein, the process proceeds to S1302, while if there is none therein, the process proceeds to S1306.

In S1302, the release pattern is added to the flow table. In this event, the release pattern is added to the upper part of the entry including a pattern used for flow identification.

In S1303, the number of release patterns of the entry which included the release pattern is updated. In specific, "1" is added to the number of release patterns.

In S1304, calculated is a value as a result of subtracting the number of release patterns from the number of compressed entries of the entry of which the release pattern has been updated. If the value is larger than "1", the process proceeds to S1305 while, if it is no larger than "1", the process proceeds to S1307.

In the S1305, the registration entry number management unit updates the number of registration entries.

In S1306, an entry corresponding to the release pattern is deleted from the entries registered in the flow table.

In the S1307, an decompression process of a compressed entry is carried out.

In S1308, an entry of which the release flag is "1" and an entry corresponding to the aforementioned entry (that is, entries of which the release flag is "0" and a series of information (e.g., a flow identification pattern and comparison (offset) information) is identical with a series of information of an entry of which the release flag is "1") are deleted.

In S1309, the number of release patterns of the decompressed entry is updated. In specific, the number of release patterns is set to "0".

The next is a description of a deletion of an entry by an expiration of the timer.

Figure 17:
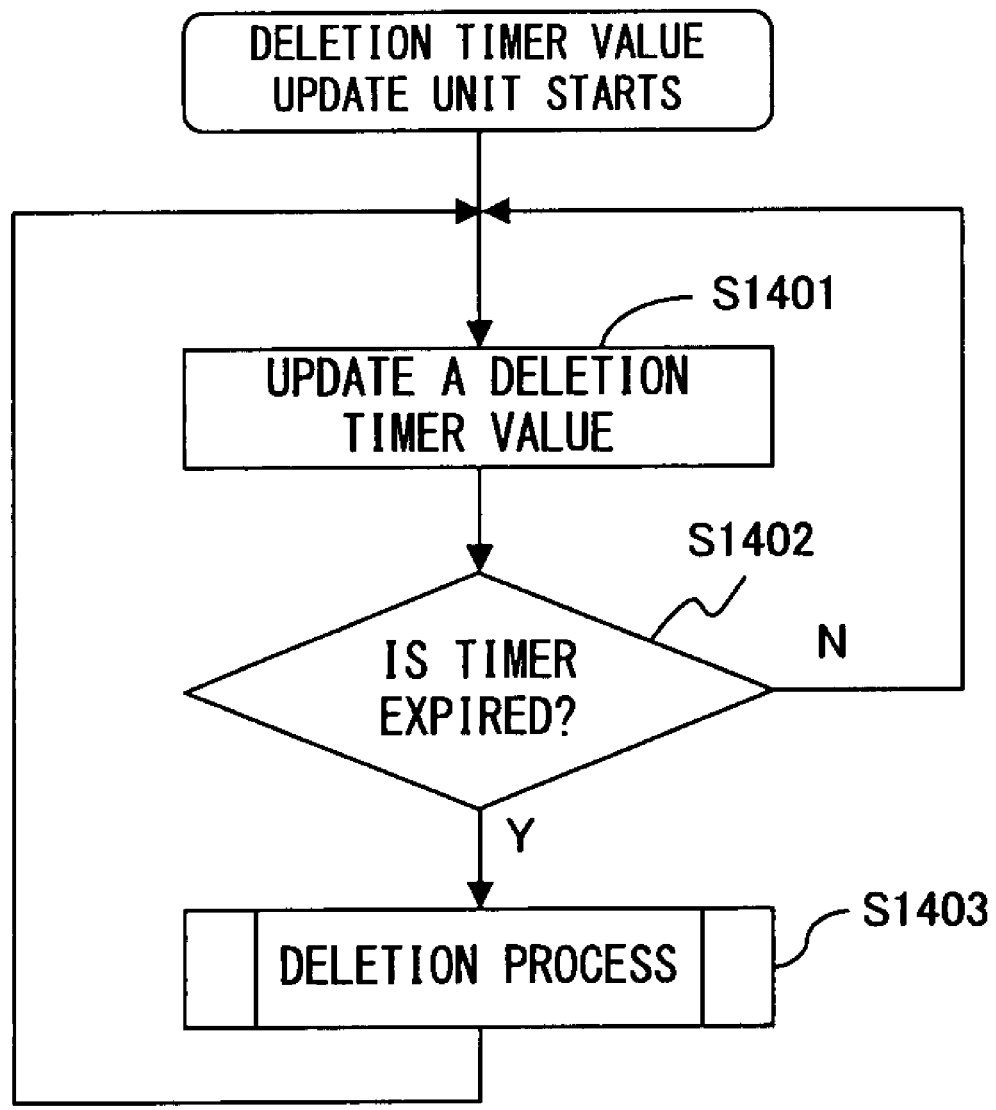
FIG. 17 is a flow chart showing a flow of a part of a process at a deletion timer value update unit.

FIG. 17 is a flow chart showing a flow of apart of a process at the deletion timer value update unit.

In the step S1401, the deletion timer value update unit 206 subtracts a deletion timer value of each entry.

In S1402, it judges whether the timer is expired. That is, it judges whether the deletion timer value has become a prescribed value. As an example, it continues to subtract the deletion timer value and judges that the timer has expired when the deletion timer value becomes 00000001. Judging an expiration of the timer, it shifts the process to S1403, otherwise it returns the process to the S1401.

In the S1403, the deletion timer value update unit 206 instructs the entry deletion process unit 205 to delete the entry, of which the timer has expired, from the flow table.

The next is a description on examples of the cases of actually carrying out registration, deletion, compression and decompression.

Figure 18B:
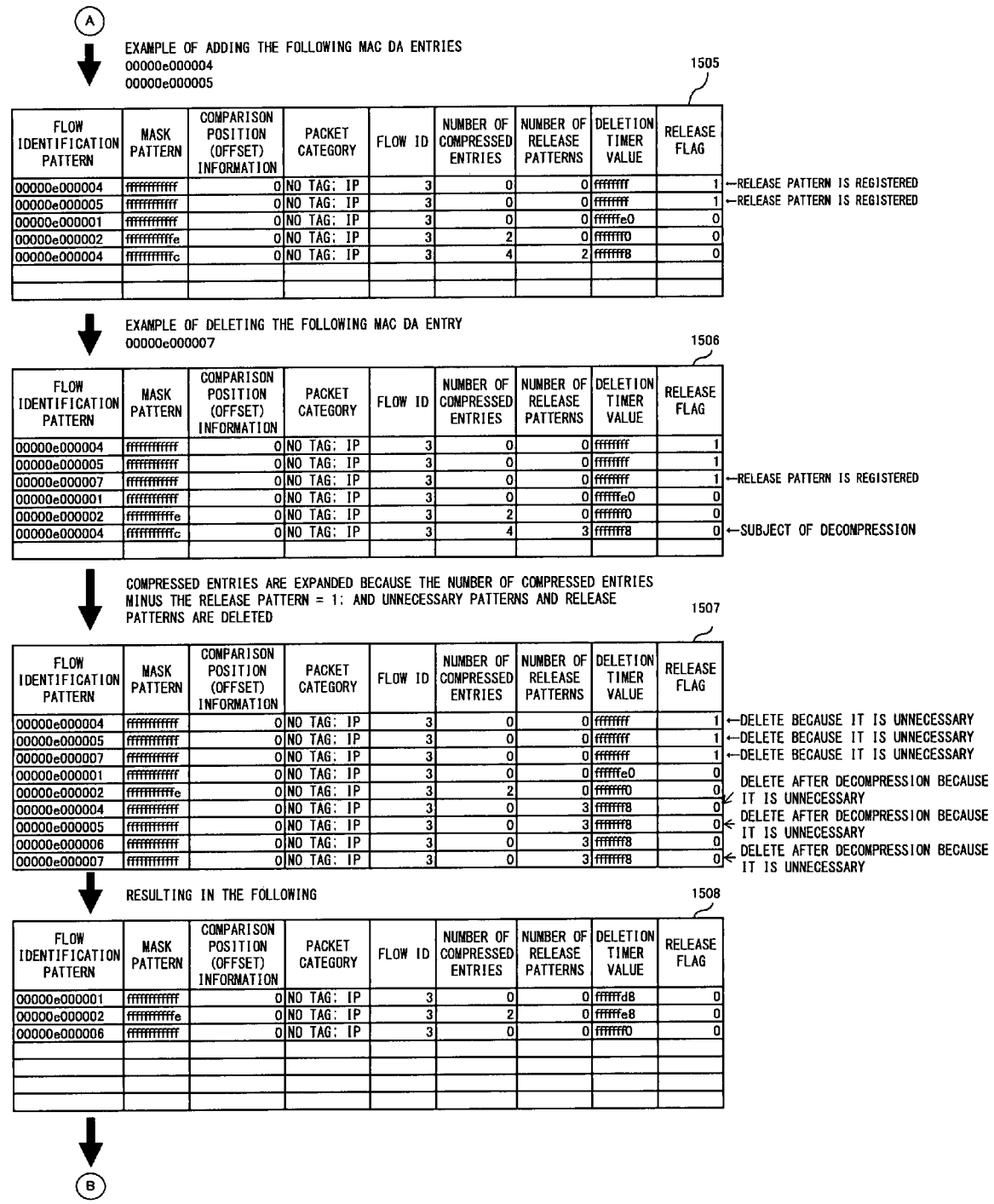
FIG. 18B is a diagram exemplifying a flow table.

FIGS. 18A, 18B and 18C are diagrams exemplifying a flow table.

Currently registered in the flow table 1501 is an entry of which the flow pattern, mask pattern, comparison position (offset) information, packet category, flow ID, the number of compressed entries, the number of release patterns, deletion timer values and release flag are, respectively, 00000e000001, ffffffffffff, 0, noTag; IP, 3, 0, 0, ffffffffffff, and 0. Here, shown is an example of a MAC destination address (DA) being registered. The flow ID=3 indicates a packet constituting a subject of discarding within the apparatus.

Now, registering patterns of which the flow identification patterns are 00000e000002, and 00000e000003, it becomes as shown in the flow table 1502.

When registering a 00000e000002, it is judged whether it can be compressed relative to the 00000e000001, that is, whether it is an incremental pattern thereto (step S802).

The flow identification pattern, i.e., 00000e000001, of the first line entry is compared with the flow identification pattern, i.e., 00000e000002, of the second line entry; and the respective mask patterns are compared with each other (S1001).

The mask patterns of both of the entries are ffffffffffff, and therefore identical (S1002).

In the following description, the upper eleven digits of the respective flow identification patterns are common and therefore the expression sometimes omits it. Expressing the respective flow identification patterns 1 and 2 of the entries of the first and second lines in the binary numbers, these are 0001 and 0010. Comparing these, the lowest first and second digits are different. Therefore, the difference is two bits. Accordingly, the judgment is a non-incremental pattern (S1005) and a normal registration process is carried out (S807).

And, when registering the 00000e000003, it is judged whether it can be compressed relative to the 00000e000002, that is, whether it is an incremental pattern thereto (the step S802) An incremental pattern judgment process is likewise carried out. Expressing the 2 and 3 respectively in the binary numbers, they are 0010 and 0011, differing only in the lowest first bit. Therefore, the difference is one bit, resulting in being judged to be an incremental pattern (S1004).

Since the 00000e000003 is an incremental pattern, a compression registration process is carried out (S804) and it is compression-registered as shown in the flow table 1503. That is, the mask pattern of the second line entry is changed to ffffffffffe, and the number of compression entries is changed to "2". And a deletion time value is set anew.

Next, when registering 00000e000004, 00000e000005, 00000e000006 and 00000e000007, the incremental pattern judgment process and compression registration process are likewise carried out, resulting in the contents as shown in the flow table 1504.

The next is a description on the case of deleting entries of which the flow identification patterns are 00000e000004 and 00000e000005. Judging whether these identification patterns exist within a compressed entry (S1301), it exists within the third line entry 00000e000004 (ffffffffffc) of the flow table 1504 and therefore the 00000e000004 and 00000e000005 are registered as release patterns in the flow table (S1302). That is, these are registered in the upper part of the flow table, with the release flag being "1". Then, an update of the number of release pattern of the third line entry (S1303) and an update of the number of compressed entries (S1305) are carried out, resulting in becoming as shown in the flow table 1505.

Further deleting an entry of which the flow pattern is 00000e000007, a similar process to the above description is carried out so that the 00000e000007 is registered as a release pattern in the flow table (S1302), resulting in the contents of the table 1506.

Then, calculating the number of compressed entries minus the number of release patterns (S1304), resulting in 4−3=1, a compressed entry decompression process (S1307) is carried out, resulting in the contents of the table 1507. Then, the release pattern (i.e., the first through third line entries) is deleted and the entries (the sixth, seventh and ninth lines entries) corresponding to the release patterns are deleted (S1308). After the number of release patterns is updated (S1309), the result is as shown in the flow table 1508.

Then, registering a pattern of which the flow identification pattern is 00000e00000, a normal registration process is carried out (S807), resulting in the contents of the table 1509. In this event, judging for a compression process in the compression process judgment (S810 and S812), an decompression process of the compressed entries (S813) is carried out and being sorted in the ascending order, resulting in the contents of the table 1510.

Then, a registration process is carried out again for the sorted entries in an ascending order. This results in compressing the entries of the first line through fourth line of the flow table, resulting in being compressed to one entry as shown in the flow table 1511.

As such, many patterns can be registered by carrying out a compression and decompression of an entry dynamically even when an entry is dynamically added or deleted.

Figure 19:
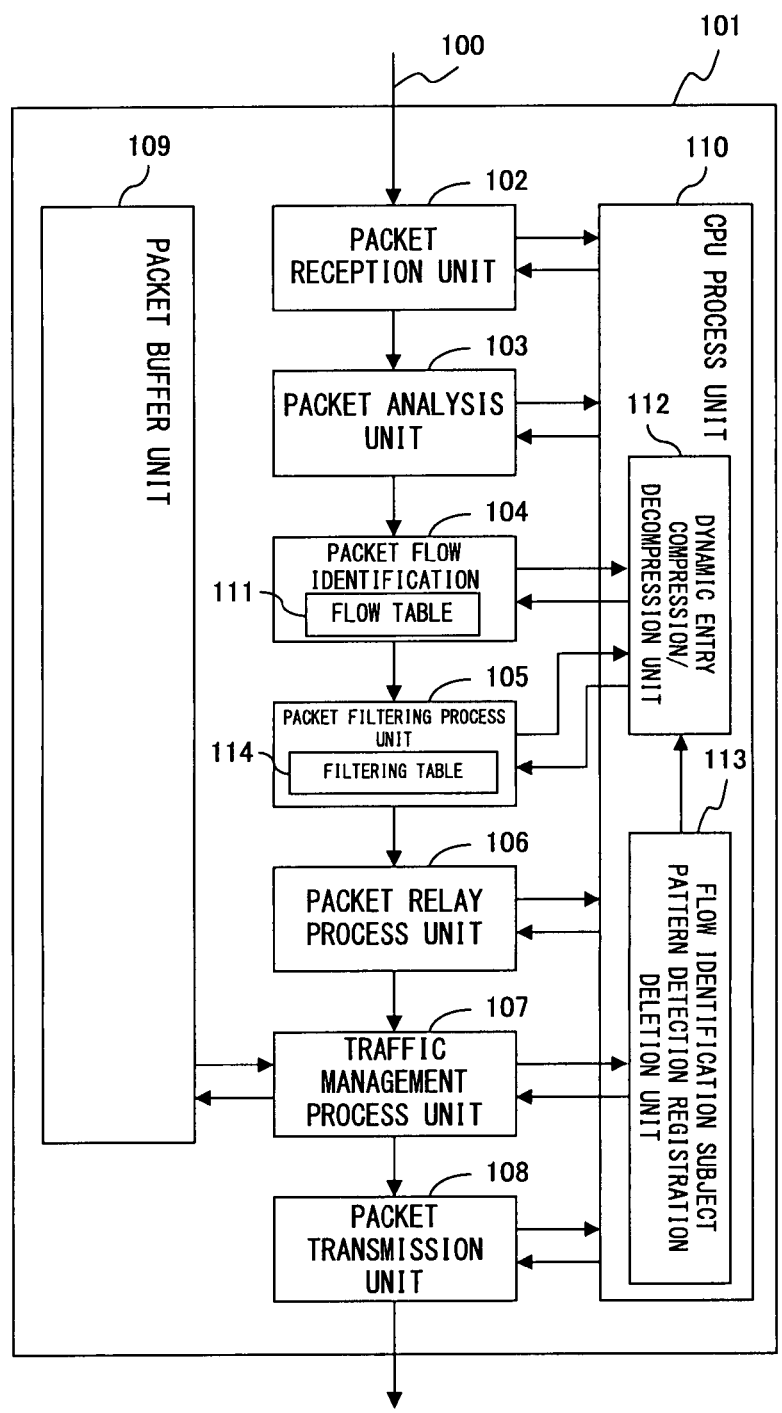
FIG. 19 is a block diagram of a packet relay apparatus according to a second embodiment of the present invention.

FIG. 19 is a block diagram of a packet relay apparatus according to a second embodiment of the present invention.

The packet relay apparatus 101 according to the second embodiment comprises a packet reception unit 102, a packet analysis unit 103, a packet flow identification unit 104, a packet filtering process unit 105, a packet relay process unit 106, a traffic management process unit 107, a packet transmission unit 108, a packet buffer unit 109 and a CPU process unit 110, with each constituent unit being interconnected by a bus, likewise the packet relay apparatus according to the first embodiment.

The packet flow identification unit 104 comprises a flow table 111.

The CPU process unit 110 comprises a dynamic entry compression/decompression unit 112 and a flow identification subject pattern detection registration deletion unit 113.

The configuration of the packet relay apparatus 101 according to the second embodiment differs from the packet relay apparatus according to the first embodiment where the packet filtering process unit 105 comprises a filtering table 114 and the packet filtering process unit 105 is connected to the dynamic entry compression/decompression unit 112.

The filtering table 114 notes a pattern of a packet constituting a subject of a packet filtering, et cetera, likewise the flow table 111. The registration, deletion, compression and decompression of an entry of the filtering table 114 are carried out by the dynamic entry compression/decompression unit 112. Also the packet filtering process unit 105 identifies as to what kind of process a packet is to be applied on the basis of the entry of the filtering table 114.

As described above, the identification of a packet at both of the packet flow identification unit 104 and packet filtering process unit 105 enables a two-stage filtering process.

What is claimed is:

1. An entry compression and decompression method for use in a packet relay apparatus carrying out flow identification based on an entry of a flow table describing a bit pattern indicating a data included in a packet which is a subject of flow identification, the method comprising:
   judging whether a new bit pattern to be registered in the flow table is an incremental pattern, that is, a difference between the bit pattern described in the entry and the new bit pattern is one bit;
   changing a mask pattern described in the entry so as to indicate a position of a bit which is capable of taking an arbitrary logical value for the bit pattern if the new bit pattern is the incremental pattern; and
   additionally registering the new bit pattern in the flow table as an entry if the new bit pattern is not the incremental pattern, wherein
   when the number of entries registered in said flow table is equal to or more than a specified value,
   decompressing a compressed entry registered in said flow table,
   deleting an entry indicating a release bit pattern and an entry corresponding to the release bit pattern among the decompressed entries,
   sorting remaining entries, and instructing a re-registration of the sorted entries.

2. An entry compression and decompression method for use in a packet relay apparatus carrying out flow identification based on an entry of a flow table describing a bit pattern indicating a data included in a packet which is a subject of flow identification, the method comprising:
   judging whether a new bit pattern to be registered in the flow table is an incremental pattern, that is, a difference between the bit pattern described in the entry and the new bit pattern is one bit;
   changing a mask pattern described in the entry so as to indicate a position of a bit which is capable of taking an arbitrary logical value for the bit pattern if the new bit pattern is the incremental pattern;

additionally registering the new bit pattern in the flow table as an entry if the new bit pattern is not the incremental pattern; and dividing the number of entries allowed to be registered in the flow table by a number of registered entries per certain time, and if a value obtained by dividing the number of entries allowed to be registered in the flow table by the number of registered entries per certain time is less than a specified value, decompressing a compressed entry among said registered entries, deleting an entry indicating a release pattern and an entry corresponding to the release pattern among the decompressed entries, sorting remaining entries, and instructing a re-registration in the sorted sequence, in the additionally registering said new pattern in said flow table as an entry.

3. The method according to claim 1, further comprising:

when trying to delete a entry including a specific bit pattern from said said flow table, registering an entry including a flag indicating that the specific bit pattern is not used for flow identification if the specific bit pattern exists in a compressed entry described the bit pattern and the mask pattern indicating a plurality of bit patterns.

4. The method according to claim 3, further comprising:

if the number of entries included in a compressed entry described the bit pattern and the mask pattern indicating a plurality of bit patterns is one decompressing the compressed entry, and deleting an entry indicating a release pattern and an entry corresponding to the release pattern among the decompressed entries.

5. The method according to claim 1, further comprising:

measuring a time period during which an entry is registered and, if the time period is equal to or more than a specified time value, deleting the entry.

6. A packet relay apparatus carrying out packet identification based on an entry of a flow table describing a bit pattern of a packet indicating a data included in a packet which is a subject of flow identification, comprising:

an incremental pattern judgment unit configured to judge whether a new bit pattern is an incremental pattern, that is, a difference between the bit pattern described in the entry and the new bit pattern is one bit, when registering the new bit pattern in the flow table;

an entry compression and decompression unit configured to compress the entry of the flow table if the new bit pattern is judged to be the incremental pattern; and a registration entry number management unit configured to manage the number of entries registered in said flow table, wherein the registration entry number management unit instructs a compression of said entry when the number of registered entries equal to or more than a specified value.

7. The packet relay apparatus according to claim 6, further comprising an average entry registration speed measurement unit configured to measure a number of registered entries, per unit time, in said flow table, wherein the average entry registration speed measurement unit divides the number of entries allowed to be registered in the flow table by the number of registered entries per the unit time and instructs a compression of the entry based on the result of the division.

8. The packet relay apparatus according to claim 6, wherein if the number of entries included in a compressed entry described the bit pattern and a mask pattern indicating a plurality of bit patterns is one, said entry compression and decompression unit decompresses the entry and deletes an entry indicating a release bit pattern and an entry corresponding to the release bit pattern among the decompressed entries.

9. The packet relay apparatus according to claim 6, further comprising:

a deletion timer value update unit configured to measure a time period during which the entry is registered, wherein the deletion timer value update unit instructs a deletion of an entry if the time period is equal to or more than a prescribed time.

* * * * *